(12) United States Patent
Namiki et al.

(10) Patent No.: US 10,446,829 B2
(45) Date of Patent: Oct. 15, 2019

(54) ELECTRODE, NONAQUEOUS ELECTROLYTE BATTERY, BATTERY PACK AND VEHICLE

(71) Applicant: KABUSHIKI KAISHA TOSHIBA, Minato-ku (JP)

(72) Inventors: Yusuke Namiki, Yokohama (JP); Keigo Hoshina, Kashiwazaki (JP); Yasuhiro Harada, Isehara (JP); Norio Takami, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 72 days.

(21) Appl. No.: 15/701,525

(22) Filed: Sep. 12, 2017

(65) Prior Publication Data

US 2018/0277828 A1    Sep. 27, 2018

(30) Foreign Application Priority Data

Mar. 22, 2017 (JP) .................................. 2017-056666
Sep. 8, 2017 (JP) .................................. 2017-173020

(51) Int. Cl.
*H01M 4/13* (2010.01)
*H01M 4/131* (2010.01)
(Continued)

(52) U.S. Cl.
CPC .......... *H01M 4/131* (2013.01); *C01G 23/005* (2013.01); *C01G 33/00* (2013.01); *C01G 33/006* (2013.01);
(Continued)

(58) Field of Classification Search
CPC ...... H01M 4/131; H01M 4/133; H01M 4/485; H01M 2004/027; H01M 2220/20; H01M 10/052; H01M 10/0525
(Continued)

(56) References Cited

U.S. PATENT DOCUMENTS

2015/0072249 A1   3/2015   Yamamoto et al.
2016/0036039 A1   2/2016   Kuriyama et al.
(Continued)

FOREIGN PATENT DOCUMENTS

JP    2015-79742 A    4/2015
JP    2016-35902 A    3/2016
(Continued)

OTHER PUBLICATIONS

Izumi Nakai, et al., "Of the Powdery X-rays analysis Actually: Introduction to lied belt method", Japan Society for Analytical Chemistry X-rays Analysis Study, Feb. 2002, pp. 97-115 with cover pages (with unedited computer generated English translation).

*Primary Examiner* — Jane J Rhee
(74) *Attorney, Agent, or Firm* — Oblon, McClelland, Maier & Neustadt, L.L.P.

(57) ABSTRACT

According to one embodiment, an electrode is provided. The electrode includes an active material-containing layer. The active material-containing layer includes an Na-containing niobium-titanium composite oxide having an orthorhombic crystal structure. The active material-containing layer satisfies $I_2/I_1 \geq 1$. $I_1$ is an intensity of a peak $P_1$ appearing in a binding energy range of 289 eV to 292 eV in an X-ray photoelectron spectroscopy spectrum of the active material-containing layer. $I_2$ is an intensity of a peak $P_2$ appearing in a binding energy range of 283 eV to 285 eV in the X-ray photoelectron spectroscopy spectrum of the active material-containing layer.

19 Claims, 9 Drawing Sheets

(51) Int. Cl.
*C01G 23/00* (2006.01)
*H01M 4/04* (2006.01)
*H01M 4/485* (2010.01)
*H01M 10/052* (2010.01)
*H01M 10/0525* (2010.01)
*H01M 4/133* (2010.01)
*C01G 33/00* (2006.01)
*H01M 4/02* (2006.01)

(52) U.S. Cl.
CPC ......... *H01M 4/0445* (2013.01); *H01M 4/133* (2013.01); *H01M 4/485* (2013.01); *H01M 10/052* (2013.01); *H01M 10/0525* (2013.01); *C01P 2002/85* (2013.01); *C01P 2004/61* (2013.01); *H01M 2004/027* (2013.01); *H01M 2220/20* (2013.01); *Y02E 60/122* (2013.01); *Y02T 10/7011* (2013.01)

(58) Field of Classification Search
USPC .......................................................... 429/224
See application file for complete search history.

(56) References Cited

U.S. PATENT DOCUMENTS

| | | |
|---|---|---|
| 2016/0226067 A1 | 8/2016 | Harada et al. |
| 2016/0268603 A1 | 9/2016 | Harada et al. |
| 2017/0271664 A1 | 9/2017 | Harada et al. |

FOREIGN PATENT DOCUMENTS

| | | |
|---|---|---|
| JP | 2016-103325 A | 6/2016 |
| JP | 2016-146359 A | 8/2016 |
| JP | 2016-171071 A | 9/2016 |
| JP | 2016-171083 A | 9/2016 |
| JP | 2017-168320 A | 9/2017 |
| WO | WO 2013/022034 A1 | 2/2013 |

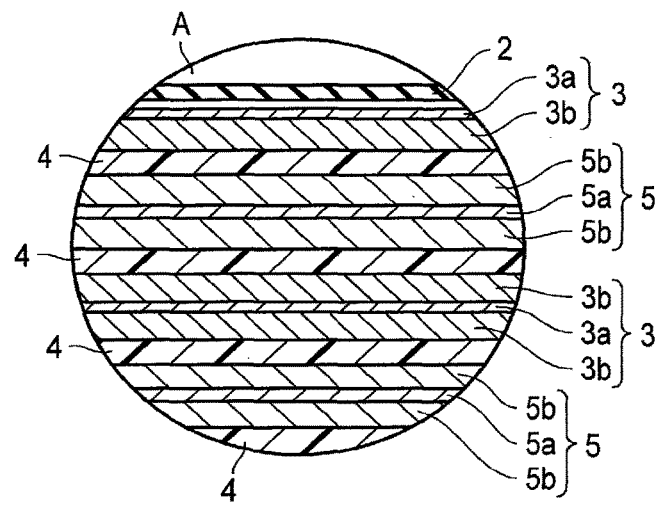
F I G. 3
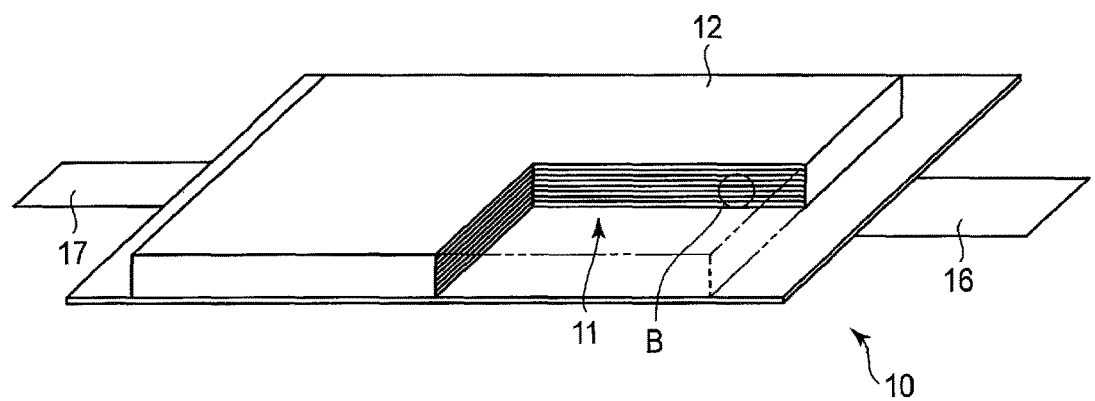
F I G. 4

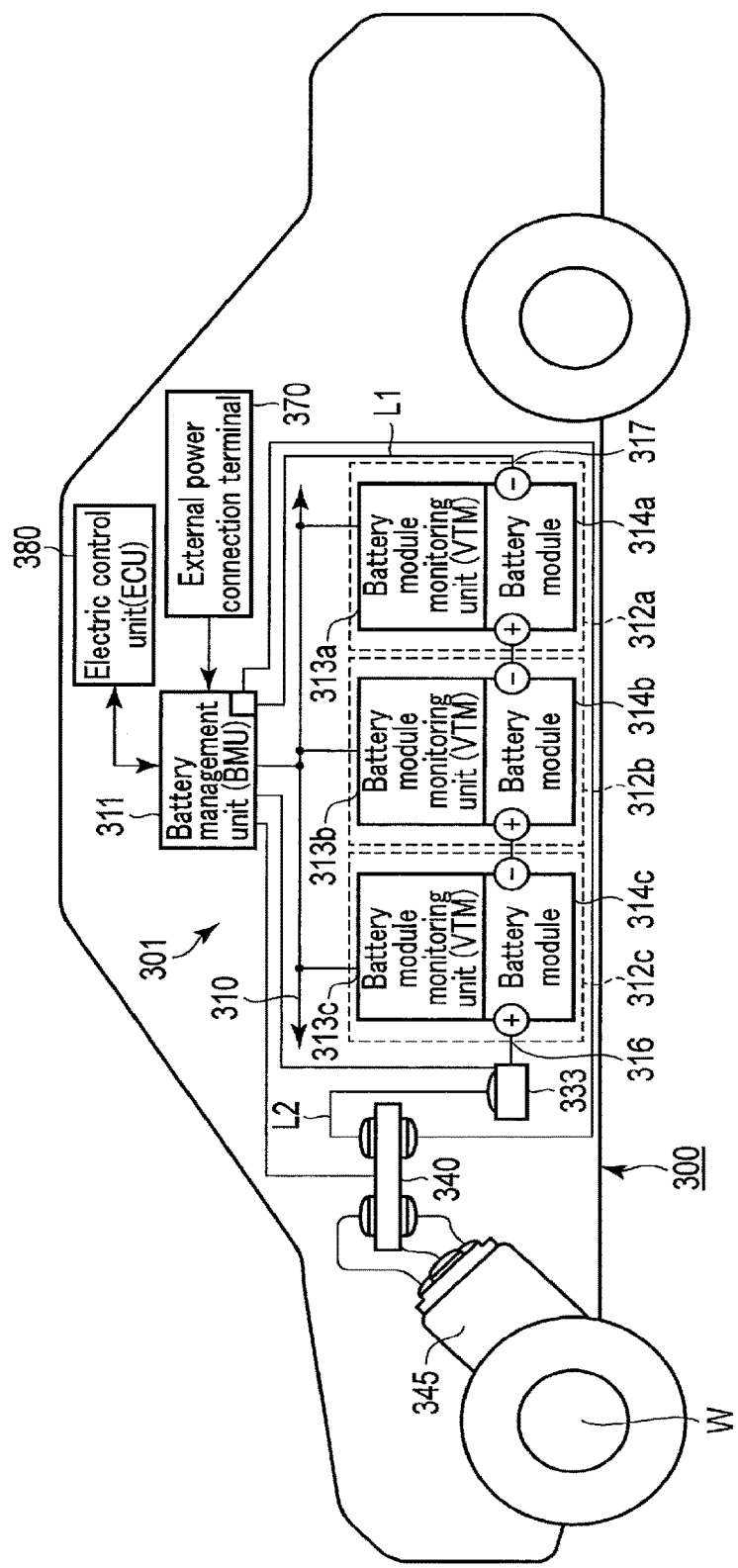
F I G. 9

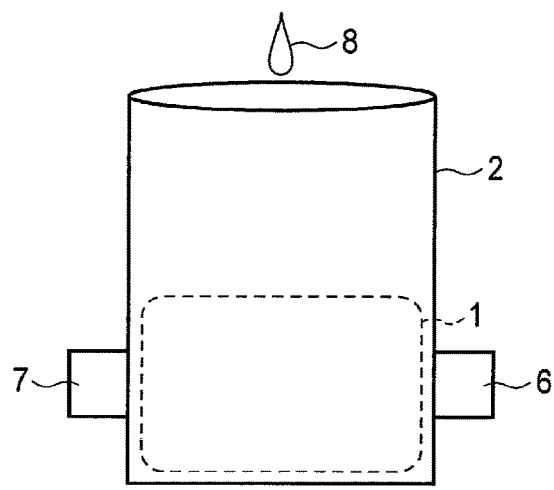
F I G. 10A
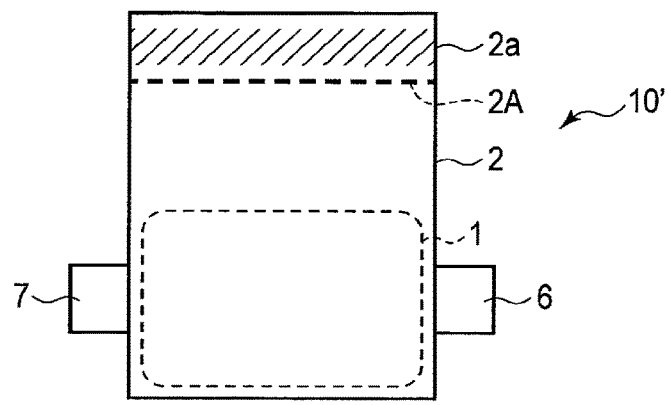
F I G. 10B
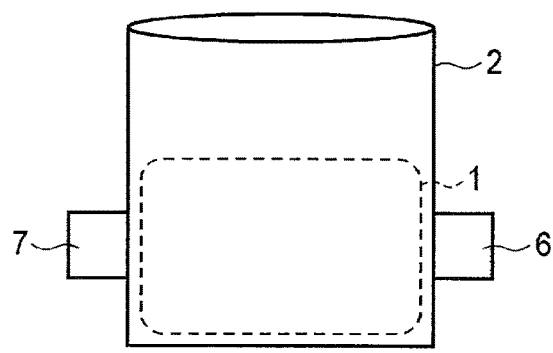
F I G. 10C

ELECTRODE, NONAQUEOUS ELECTROLYTE BATTERY, BATTERY PACK AND VEHICLE

CROSS-REFERENCE TO RELATED APPLICATIONS

This application is based upon and claims the benefit of priority from the Japanese Patent Applications No. 2017-056666, filed Mar. 22, 2017; and No. 2017-173020, filed Sep. 8, 2017, the entire contents of all of which are incorporated herein by reference.

FIELD

Embodiments described herein relate generally to an electrode, a nonaqueous electrolyte battery, a battery pack and a vehicle.

BACKGROUND

A nonaqueous electrolyte battery in which a charge and a discharge are performed by migration of lithium ions between a negative electrode and a positive electrode has been actively researched as a high energy density battery.

In addition to the use as a power supply for small electronic devices, the nonaqueous electrolyte battery is expected to be utilized also as a medium to large-size power source, such as for in-vehicle applications and stationary applications. The nonaqueous electrolyte battery is required to have excellent life characteristics and high stability in such medium to large size applications. The nonaqueous electrolyte battery is further required to have high input-and-output characteristics.

Examples of nonaqueous electrolyte batteries having excellent life characteristics and high stability include a nonaqueous electrolyte battery in which a lithium titanate having a spinel-type crystal structure is used in a negative electrode. The lithium titanate having the spinel-type crystal structure has a high lithium insertion-and-extraction potential of approximately 1.55 V (vs. Li/Li$^+$). Therefore, a battery voltage of a nonaqueous electrolyte battery using the lithium titanate having the spinel-type crystal structure in a negative electrode is low. Further, the lithium titanate having the spinel-type crystal structure is characterized in that in the lithium insertion-and-extraction potential ranges, it exhibits a very small change in a potential accompanying a change in a state-of-charge. That is, each of the charge and discharge curves of the lithium titanate having the spinel-type crystal structure includes a flat portion of a potential within the lithium insertion-and-extraction potential range.

In such a nonaqueous electrolyte battery, the life characteristics is required to be further improved.

BRIEF DESCRIPTION OF THE DRAWINGS

FIG. 3 is an enlarged cross-sectional view showing a portion A in FIG. 2;

FIG. 4 is a partially cutaway perspective view schematically showing another example of a nonaqueous electrolyte battery according to the embodiment;

FIG. 9 shows a structure of another example of a vehicle according to an embodiment;

FIG. 10A is a schematic view illustrating a part of a fabrication procedure of a nonaqueous electrolyte battery of Example 1;

FIG. 10B is a schematic view illustrating a part of the fabrication procedure of the nonaqueous electrolyte battery of Example 1;

FIG. 10C is a schematic view illustrating a part of the fabrication procedure of the nonaqueous electrolyte battery of Example 1;

DETAILED DESCRIPTION

Figure 1:
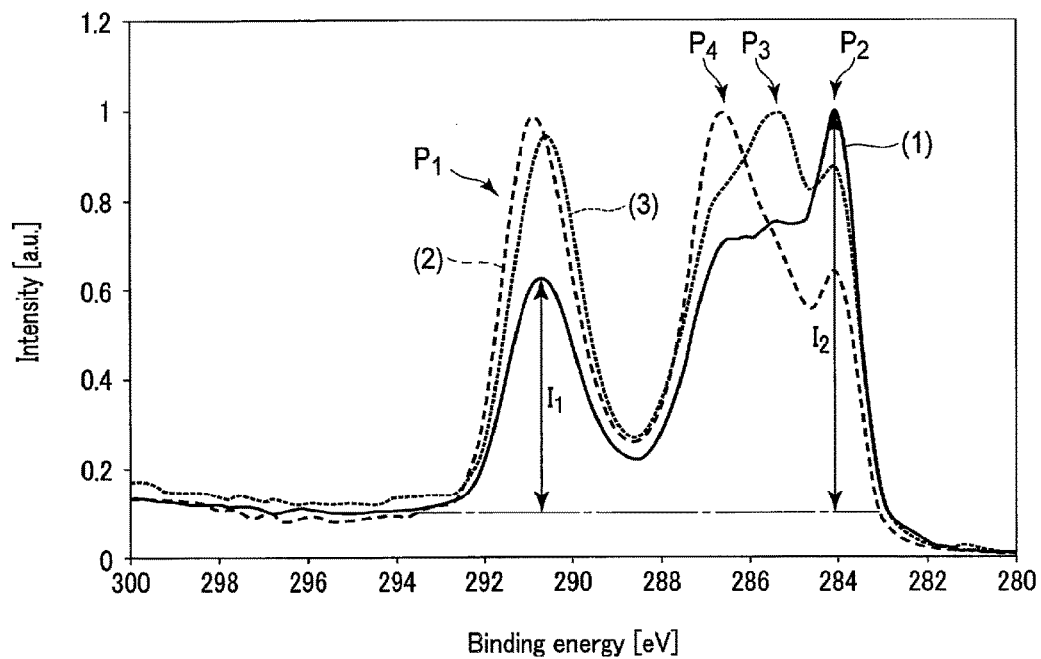
FIG. 1 shows parts of XPS spectra of a surface of a negative electrode included in a nonaqueous electrolyte battery that is an example according to an embodiment, and surfaces of negative electrodes included in batteries of reference examples.

In general, according to an embodiment, an electrode is provided. The electrode includes an active material-containing layer. The active material-containing layer includes an Na-containing niobium-titanium composite oxide having an orthorhombic crystal structure. The active material-containing layer satisfies $I_2/I_1 \geq 1$. $I_1$ is an intensity of a peak $P_1$ appearing in a binding energy range of 289 eV to 292 eV in an X-ray photoelectron spectroscopy spectrum (XPS spectrum) of the active material-containing layer. $I_2$ is an intensity of a peak $P_2$ appearing in a binding energy range of 283 eV to 285 eV in the X-ray photoelectron spectroscopy spectrum of the active material-containing layer. The X-ray photoelectron spectroscopy spectrum is obtained according to an X-ray photoelectron spectroscopy (XPS).

According to an embodiment, a nonaqueous electrolyte battery is provided. The nonaqueous electrolyte battery includes a negative electrode, a positive electrode, and a nonaqueous electrolyte. The negative electrode includes a negative electrode active material-containing layer. The negative electrode active material-containing layer includes an Na-containing niobium-titanium composite oxide having an orthorhombic crystal structure. The negative electrode active material-containing layer satisfies $I_2/I_1 \geq 1$. $I_1$ is an intensity of a peak $P_1$ appearing in a binding energy range of 289 eV to 292 eV in an X-ray photoelectron spectroscopy spectrum (XPS spectrum) of the negative electrode active material-containing layer. $I_2$ is an intensity of a peak $P_2$ appearing in a binding energy range of 283 eV to 285 eV in the X-ray photoelectron spectroscopy spectrum of the negative electrode active material-containing layer. The X-ray photoelectron spectroscopy spectrum is obtained according to an X-ray photoelectron spectroscopy (XPS).

According to an embodiment, a battery pack is provided. The battery pack includes a nonaqueous electrolyte battery according to the embodiment.

According to an embodiment, a vehicle is provided. The vehicle includes a battery pack according to the embodiment.

The embodiments will be explained below with reference to the drawings. In this case, the structures common to all embodiments are represented by the same symbols and duplicated explanations will be omitted. Also, each drawing is a typical view for explaining the embodiments and for promoting an understanding of the embodiments. Though there are parts different from an actual device in shape, dimension and ratio, these structural designs may be properly changed taking the following explanations and known technologies into consideration.

First Embodiment

According to a first embodiment, an electrode and a nonaqueous electrolyte battery are provided. The nonaqueous electrolyte battery includes the electrode as a negative electrode, a positive electrode, and a nonaqueous electrolyte. The negative electrode includes a negative electrode active material-containing layer. The negative electrode active material-containing layer includes an Na-containing niobium-titanium composite oxide having an orthorhombic crystal structure. The negative electrode active material-containing layer satisfies $I_2/I_1 \geq 1$. $I_1$ is an intensity of a peak $P_1$ appearing in a binding energy range of 289 eV to 292 eV in an X-ray photoelectron spectroscopy spectrum (XPS spectrum) of the negative electrode active material-containing layer. $I_2$ is an intensity of a peak $P_2$ appearing in a binding energy range of 283 eV to 285 eV in the X-ray photoelectron spectroscopy spectrum of the negative electrode active material-containing layer. The X-ray photoelectron spectroscopy spectrum is obtained according to an X-ray photoelectron spectroscopy (XPS).

An Na-containing niobium-titanium composite oxide having an orthorhombic crystal structure included in the negative electrode of the nonaqueous electrolyte battery according to the first embodiment is a composite oxide which can insert or extract Li at a low potential, among titanium-containing oxides. For example, an Na-containing niobium-titanium composite oxide which has an orthorhombic crystal structure and is represented by a general formula of $Li_{2+v}Na_{2-w}M1_xTi_{6-y-z}Nb_yM2_zO_{14+\delta}$, can exhibit a lithium insertion-and-extraction potential, that is, an operating potential, within a range of 1.2 V to 1.4 V (vs. Li/Li$^+$). In the above general formula, M1 is at least one selected from the group consisting of Cs, K, Mg, Sr, Ba and Ca, M2 is at least one selected from the group consisting of Zr, Sn, V, Ta, Mo, W, Fe, Co, Mn and Al, $0 \leq v \leq 4$, $0 < w < 2$, $x \leq 2$, $0 < y < 2$, $0 \leq z \leq 3$, and $-0.5 \leq \delta \leq 0.5$.

In addition, for example, the Na-containing niobium-titanium composite oxide which has the orthorhombic crystal structure and is represented by the above general formula can exhibit a large potential change accompanying a change in a state-of-charge within the above operating potential range.

Thus, compared to a nonaqueous electrolyte battery which uses lithium titanate in the negative electrode, the nonaqueous electrolyte battery which uses the Na-containing niobium-titanium composite oxide having the orthorhombic crystal structure in the negative electrode can exhibit a higher battery voltage, and enables easier grasping of a state-of-charge, based on a change in potential.

However, the inventors have found, as a result of assiduous studies, that the orthorhombic Na-containing niobium-titanium composite oxide has a high reactivity, and thus has such a problem that a side reaction with a nonaqueous electrolyte tends to easily occur. In addition, the inventors have found that the nonaqueous electrolyte battery using the orthorhombic Na-containing niobium titanium composite oxide has a problem that the nonaqueous electrolyte battery is poor in life characteristics due to this side reaction. As a result of assiduous studies for solving these problems, the inventors have realized the nonaqueous electrolyte battery according to the first embodiment.

The nonaqueous electrolyte battery according to the first embodiment includes a negative electrode active material-containing layer which includes an Na-containing niobium titanium composite oxide having an orthorhombic crystal structure, and which exhibits an intensity ratio $I_2/I_1$ is 1 or more in an X-ray photoelectron spectroscopy spectrum (XPS spectrum) according to X-ray photoelectron spectroscopy (XPS). It can be said that in such a nonaqueous electrolyte battery, a film including a C—C moiety and/or a $CH_\alpha$ moiety (where a is 1 to 3) is sufficiently formed on the negative electrode active material-containing layer. A detailed reason for this will be described below with reference to FIG. 1. In such a nonaqueous electrolyte battery according to the first embodiment, although the negative electrode active material-containing layer includes the Na-containing niobium-titanium composite oxide having the orthorhombic crystal structure, the film formed on the surface of the negative electrode active material-containing layer can prevent a side reaction between the Na-containing niobium-titanium composite oxide and the nonaqueous electrolyte. As a result, the nonaqueous electrolyte battery according to the first embodiment can exhibit excellent life characteristics.

Next, referring to FIG. 1, there will be described the reason why a sufficient film is formed on the surface of the negative electrode active material-containing layer in the nonaqueous electrolyte battery according to the first embodiment.

FIG. 1 shows parts of XPS spectra of a surface of a negative electrode included in a nonaqueous electrolyte battery that is an example according to the first embodiment, and surfaces of negative electrodes included in batteries of reference examples.

A spectrum (1) indicated by a solid line in FIG. 1 is an XPS spectrum relating to a C1s orbital of the surface of the negative electrode included in the nonaqueous electrolyte battery that is a first example according to the first embodiment. In addition, a spectrum (2) indicated by a broken line in FIG. 1 is an XPS spectrum relating to a C1s orbital of the surface of a negative electrode included in a nonaqueous electrolyte battery of Reference Example 1, which was fabricated according to the same procedures as those of the nonaqueous electrolyte battery of the first example, except that an aging process to be described later in detail was not performed. Besides, a spectrum (3) indicated by a dotted line in FIG. 1 is an XPS spectrum relating to a C1s orbital of the surface of a negative electrode included in a nonaqueous electrolyte battery of Reference Example 2, which was fabricated according to the same procedures as those of the nonaqueous electrolyte battery of the first example, except that the composition of the nonaqueous electrolyte was changed. In Reference Example 2, the nonaqueous electrolyte included in a battery unit, which was subjected to aging, did not include ethylene carbonate.

A peak $P_1$ having a peak top in a binding energy range of 289 eV to 292 eV in each of the three spectra (1) to (3) shown in FIG. 1 appears also in XPS spectra with respect to surfaces of negative electrodes before incorporated into the battery. It can thus be said that the peak $P_1$ is a peak derived from constituent materials of the negative electrode active material-containing layer, to be more specific, a conductive agent and a binder.

By comparison among the three spectra (1) to (3) shown in FIG. 1, it is found that an intensity $I_1$ of the peak $P_1$ of the spectrum (1) relating to the battery of the first example according to the first embodiment is smallest. Meanwhile, it is found that the spectra (2) and (3) relating to the batteries of Reference Examples 1 and 2 have similar intensities of the peak $P_1$.

On the other hand, in each of the three spectra (1) to (3) illustrated in FIG. 1, a peak $P_2$ having a peak top in a binding energy range of 283 eV to 285 eV shows a different behavior from the peak $P_1$. Specifically, as is clear from FIG. 1, an intensity $I_2$ of the peak $P_2$ of the spectrum (1) is greater than that of the peak $P_2$ of each of the spectra (2) and (3). In addition, it is found that the intensity $I_2$ of the peak $P_2$ of the spectrum (2) of the battery of Reference Example 1, which was not subjected to aging, is smallest. From this fact, it is found that the peak $P_2$ is a peak derived from a substance which formed due to the aging that is to be described below in detail.

Taken together, from the behavior of the peak $P_1$, it is thought that, in the negative electrode exhibiting the XPS spectrum (1), the intensity $I_1$ of the peak $P_1$, which is derived from the constituent material of the negative electrode active material-containing layer, was low, since some substance, namely a surface film, is formed on the surface of the negative electrode active material-containing layer. In addition, from the behavior of the peak $P_2$, it is found that the surface film, which is formed on the surface of the negative electrode active material-containing layer of the negative electrode that exhibits the XPS spectrum (1), is a substance formed due to the aging which will be described below in detail.

Should be noted that, the peak $P_1$ may be assigned to C which constitutes a COO moiety and/or a $CO_3^{2-}$ moiety. In addition, the peak $P_2$ may be assigned to C which constitutes a C—C moiety and/or a $CH_a$ moiety (where a is 1 to 3).

Furthermore, like the peak $P_2$, a peak $P_3$ of the spectrum (3), which has a peak top in a binding energy range of 284 eV to 286 eV, may be assigned to C which constitutes a C—C moiety and/or a $CH_a$ moiety. It is thought that, since the film is not sufficiently formed by the aging, the peak $P_3$ has a peak top in a higher energy region than the peak $P_2$.

In addition, a peak $P_4$, which is remarkable in the spectrum (2), has a peak top in a binding energy range of 286 eV to 287 eV. This peak $P_4$ may be assigned to C which constitutes a C—O moiety and/or a C—N moiety.

The film formed on the surface of the negative electrode active material-containing layer can suppress a side reaction between the Na-containing niobium-titanium composite oxide included in the negative electrode active material-containing layer and the nonaqueous electrolyte.

The intensity ratio $I_2/I_1$ is a ratio of the intensity of the peak $P_2$, which is derived from the component of the surface film, to the intensity of the peak $P_1$, which is derived from the constituent material of the negative electrode active material-containing layer. As described above, in the nonaqueous electrolyte battery according to the first embodiment, in which this intensity ratio $I_2/I_1$ is 1 or more, a sufficient film is formed on the surface of the negative electrode active material-containing layer, and a side reaction between the Na-containing niobium-titanium composite oxide included in the negative electrode active material-containing layer and the nonaqueous electrolyte can be suppressed. As a result, the nonaqueous electrolyte battery according to the first embodiment can exhibit excellent life characteristics.

On the other hand, in the nonaqueous electrolyte battery in which the intensity ratio $I_2/I_1$ is less than 1, a sufficient film is not formed on the surface of the negative electrode active material-containing layer. In such a nonaqueous electrolyte battery, since it is not possible to fully suppress a side reaction between the Na-containing niobium-titanium composite oxide included in the negative electrode active material-containing layer and the nonaqueous electrolyte, this nonaqueous electrolyte battery cannot exhibit excellent life characteristics.

It is preferable that the intensity ratio $I_2/I_1$ is not greater than 5. When the intensity ratio $I_2/I_1$ is within a range of 1 to 5, the film is properly formed. It is more preferable that the intensity ratio $I_2/I_1$ is within a range of 1 to 3.

Should be noted that, for example, lithium titanate having a spinel-type crystal structure (e.g. $Li_4Ti_5O_{12}$) has a lower reactivity with a nonaqueous electrolyte than the Na-containing niobium-titanium composite oxide having the orthorhombic crystal structure. Thus, in the nonaqueous electrolyte battery which does not include the Na-containing niobium-titanium composite oxide having the orthorhombic crystal structure, but includes, instead, the lithium titanate having the spinel-type crystal structure, an improvement in life characteristics by setting the intensity ratio $I_2/I_1$ at 1 or more cannot be expected. It is thought that the reason for this is that the lithium titanate has a higher operating potential than the Na-containing niobium-titanium composite oxide having the orthorhombic crystal structure, and thus it is difficult to form a film on the surface of the negative electrode. Furthermore, the lithium titanate can exhibit excellent cycle characteristics, regardless of the value of the intensity ratio $I_2/I_1$.

Subsequently, the nonaqueous electrolyte battery according to the first embodiment will be described in detail.

The nonaqueous electrolyte battery according to the first embodiment includes a negative electrode, a positive electrode, and a nonaqueous electrolyte.

The negative electrode includes a negative electrode active material-containing layer. The negative electrode can further include a negative electrode current collector. The negative electrode current collector can have two surfaces each of which faces to a direction contrary to each other. The negative electrode current collector has, for example, a band shape. The negative electrode active material-containing layer can be supported on one surface or both surfaces of the negative electrode current collector. The negative electrode current collector can include a part on which the negative electrode active material-containing layer is not supported. This part can serve as, for example, a negative electrode tab. Alternatively, the negative electrode can include a negative electrode tab which is not a part of the negative electrode current collector.

The negative electrode active material-containing layer can include a negative electrode active material. The Na-containing niobium-titanium composite oxide having the orthorhombic crystal structure can be included in the negative electrode active material-containing layer as the negative electrode active material or a part of the negative electrode active material. The negative electrode active material-containing layer can further include a conductive agent and a binder.

The negative electrode active material-containing layer can constitute the surface of the negative electrode. Specifically, it can be said that the X-ray photoelectron spectroscopy spectrum of the negative electrode is the X-ray photoelectron spectroscopy spectrum of the surface of the negative electrode active material-containing layer.

As described above, the nonaqueous electrolyte battery according to the first embodiment is in the state in which the film is formed on the surface of the negative electrode active material-containing layer. It should be noted, however, that this film is very thin, compared to the thickness of the negative electrode active material-containing layer. It is thus difficult to confirm the presence of this film as an image, either by the naked eye, as a matter of course, or even by a scanning electron microscope, for instance. However, if the intensity ratio $I_2/I_1$, which is obtained according to the X-ray photoelectron spectroscopy of the negative electrode active material-containing layer, is 1 or more, it can be said, based on the above-described reason, that the film is sufficiently formed on the surface of the negative electrode active material-containing layer. In addition, although it is possible to confirm the presence of the film and to estimate the origin thereof, from the result of XPS, it is difficult to confirm the composition itself of the film.

The positive electrode can include a positive electrode current collector and a positive electrode active material-containing layer. The positive electrode current collector can have two surfaces each of which faces to a direction contrary to each other. The positive electrode current collector has, for example, a band shape. The positive electrode active material-containing layer can be supported on one surface or both surfaces of the positive electrode current collector. The positive electrode current collector can include a part on which the positive electrode active material-containing layer is not supported. This part can serve as, for example, a positive electrode tab. Alternatively, the positive electrode can include a positive electrode tab which is not a part of the positive electrode current collector. The positive electrode active material-containing layer can include, for example, a positive electrode active material, a conductive agent and a binder.

The nonaqueous electrolyte battery according to the first embodiment can further include a separator, a container member, a positive electrode terminal and a negative electrode terminal.

The positive electrode and the negative electrode can constitute an electrode group in which a separator is sandwiched between the positive electrode and the negative electrode. The nonaqueous electrolyte may be held in the electrode group. The electrode group may have various structures. The electrode group may have a stack structure. The electrode group having the stack structure can be obtained by, for example, stacking the positive electrodes and the negative electrodes with separators each of which is sandwiched between one positive electrode and one negative electrode. Alternatively, the electrode group may have a wound structure. The electrode group having the wound structure can be obtained by, for example, stacking the positive electrode and the negative electrode with a separator which is sandwiched between the positive electrode and the negative electrode to obtain a stack, and then winding the stack thus obtained. The wound product can be subjected to a press treatment. The electrode group may have a structure other than those structure described above.

The container member can accommodate the electrode group and the nonaqueous electrolyte. The positive electrode terminal may be electrically connected to the positive electrode. The negative electrode terminal may be electrically connected to the negative electrode.

Hereinafter, the positive electrode, the negative electrode, the nonaqueous electrolyte, the separator, the container member, the positive electrode terminal, and the negative electrode terminal will be described in detail.

1) Positive Electrode

The positive electrode current collector is preferably an aluminum foil, or an aluminum alloy foil including at least one element selected from the group consisting of Mg, Ti, Zn, Mn, Fe, Cu and Si.

The thickness of each of the aluminum foil and the aluminum alloy foil is, for example, 20 μm or less, and is, more preferably, 15 μm or less. The purity of the aluminum foil is preferably 99% by mass or more. As the aluminum alloy, an alloy including an element such as magnesium, zinc or silicon is preferable. On the other hand, it is preferable that the content of a transition metal, such as iron, copper, nickel or chromium, is 1% or less.

As the positive electrode active material, for example, at least one selected from the following can be used: manganese dioxide ($MnO_2$), iron oxide, copper oxide, and nickel oxide, into which lithium can be inserted and from which lithium can be extracted, and a lithium-manganese composite oxide (e.g. $Li_xMn_{2-y}M_yO_4$ or $Li_xMn_{1-y}M_yO_2$), a lithium-nickel composite oxide (e.g. $Li_xNi_{1-x}M_yO_2$), a lithium-cobalt composite oxide (e.g. $Li_xCo_{1-y}M_yO_2$), a lithium-nickel-cobalt composite oxide (e.g. $Li_xNi_{1-y-z}Co_yM_zO_2$), a lithium-manganese-cobalt composite oxide (e.g. $Li_xMn_{1-y-z}Co_yM_zO_2$), a lithium-nickel-cobalt-manganese composite oxide (e.g. $Li_xNi_{1-y-z}Co_yMn_zO_2$), a lithium-nickel-cobalt-aluminum composite oxide (e.g. $Li_xNi_{1-y-z}Co_yAl_zO_2$), a lithium-manganese-nickel composite oxide having a spinel-type crystal structure (e.g. $Li_xMn_{2-y}Ni_yO_4$), a lithium phosphate having an olivine-type crystal structure (e.g. $Li_xFePO_4$, $Li_xMnPO_4$, $Li_xMn_{1-y}Fe_yPO_4$, $Li_xCoPO_4$, $Li_xMn_{1-y-z}Fe_yM_zPO_4$), iron sulfate ($Fe_2(SO_4)_3$), and a vanadium oxide (e.g. $V_2O_5$). In the above, it is preferable that $0<x\leq1$, $0\leq y\leq1$, and $0\leq z\leq1$. In the above, M is at least one element selected from the group consisting of Mg, Ca, Al, Ti, Zn and Zr.

It is preferable to use, among these, at least one selected from the group consisting of the lithium manganese composite oxide ($Li_xMn_{2-y}M_yO_4$), the lithium cobalt composite oxide ($Li_xCo_{1-y}M_yO_2$), the lithium nickel cobalt composite oxide (e.g. $Li_xNi_{1-y-z}Co_yM_zO_2$), the lithium manganese cobalt composite oxide (e.g. $Li_xMn_{1-y-z}Co_yM_zO_2$), the lithium nickel cobalt manganese composite oxide (e.g. $Li_xNi_{1-y-z}Co_yMn_zO_2$), and lithium phosphate having an olivine-type structure (e.g. $Li_xFePO_4$, $Li_xMnPO_4$, $Li_xMn_{1-y}Fe_yPO_4$, $Li_xCoPO_4$, $Li_xMn_{1-y-z}Fe_yM_zPO_4$) In the above, it is preferable that $0<x\leq1$, $0\leq y\leq1$, and $0\leq z\leq1$.

The positive electrode including the lithium-cobalt composite oxide can exhibit excellent rate characteristics, and is thus preferable. In addition, the positive electrode including the lithium-nickel-cobalt-manganese composite oxide can realize a high energy density and can exhibit more excellent life characteristics, and is thus preferable. Besides, the positive electrode including the spinel-type lithium-manganese composite oxide can realize excellent life characteristics and excellent rate characteristics, and is thus preferable. Additionally, the positive electrode including the olivine-type lithium-manganese-iron composite phosphate can realize excellent life characteristics, in particular, excellent life characteristics at high temperatures, and is thus preferable.

The positive electrode active material can have, for example, a shape of particles. The particles of the positive electrode active material may be primary particles, or may include secondary particles which are formed by agglomeration of the primary particles. The particles of the positive electrode active material may be a mixture of the primary particles and secondary particles. An average primary particle size of the primary particles is preferably in a range of 10 nm to 10 µm, and is more preferably in a range of 50 nm to 5 µm. An average secondary particle size of the secondary particles is preferably in a range of 500 nm to 50 µm, and is more preferably in a range of 1 µm to 20 µm.

The conductive agent is blended as needed, in order to enhance a current collection performance and to reduce contact resistance between the active material and current collector. Examples of the conductive agent include carbonaceous substances such as acetylene black, Ketjenblack, graphite, and/or coke. As the conductive agent, one of these carbonaceous substances may be used singly, or plural carbonaceous substances may be used in combination.

The binder can have a function of binding the active material, conductive agent and current collector. As the binder, for example, at least one selected from the group consisting of the following can be used: polytetrafluoroethylene (PTFE), polyvinylidene fluoride (PVdF), a cellulose-based compound such as sodium carboxymethylcellulose (Na salt of CMC), fluorine-based rubber, styrene-butadiene rubber, acrylic resin or a copolymer thereof, polyacrylic acid, and polyacrylonitrile. However, the binder is not limited to these.

It is preferable that the positive electrode active material, the conductive agent and the binder are blended at a ratio of 80% by mass to 95% by mass, 3% by mass to 18% by mass, and 2% by mass to 17% by mass, respectively. By setting the amount of the conductive agent to 3% by mass or more, the above-described advantageous effects can be obtained. By setting the amount of the conductive agent to 18% by mass or less, it is possible to reduce decomposition of the nonaqueous electrolyte on the surface of the conductive agent in storage at high temperatures. By setting the amount of the binder to 2% by mass or more, a sufficient electrode strength can be obtained. By setting the amount of the binder to 17% by mass or less, it is possible to reduce the content of the binder which is an insulating material in the positive electrode, and to reduce the internal resistance.

The positive electrode can be fabricated, for example, in the following manner. To start with, the above-described positive electrode active material, conductive agent and binder are provided. Then, these are suspended in a proper solvent, and the slurry thus obtained is coated on one surface or both surfaces of the current collector such as an aluminum foil, and then dried. The slurry is dried, and then the current collector is pressed, and thereby the positive electrode is obtained. The obtained positive electrode is, for example, a strip-shaped electrode. Alternatively, the positive electrode may be fabricated by forming the positive electrode active material, conductive agent and binder in a pellet shape as a positive electrode active material-containing layer, and providing this positive electrode active material-containing layer on the current collector.

2) Negative Electrode

The negative electrode current collector is preferably an aluminum foil, or an aluminum alloy foil including at least one element selected from the group consisting of Mg, Ti, Zn, Mn, Fe, Cu and Si.

The thickness of each of the aluminum foil and the aluminum alloy foil is 20 µm or less, and is, more preferably, 15 µm or less. It is preferable that the purity of the aluminum foil is 99% by mass or more. As the aluminum alloy, an alloy including an element such as magnesium, zinc or silicon is preferable. On the other hand, it is preferable that the content of a transition metal, such as iron, copper, nickel or chromium, is 1% by mass or less.

As described above, the Na-containing niobium-titanium composite oxide having the orthorhombic crystal structure can be included in the negative electrode active material-containing layer as the negative electrode active material, or as a part of the negative electrode active material. That is, the negative electrode active material may include other negative electrode active material than the Na-containing niobium-titanium composite oxide having the orthorhombic crystal structure. This other negative electrode active material will be described later.

The Na-containing niobium-titanium composite oxide having the orthorhombic crystal structure accounts for preferably 70% by mass or more, and more preferably 80% by mass or more, of the mass of the negative electrode active material included in the negative electrode active material-containing layer. It is still more preferable that the negative electrode active material includes no other negative electrode active material than the Na-containing niobium-titanium composite oxide having the orthorhombic crystal structure.

The Na-containing niobium-titanium composite oxide having the orthorhombic crystal structure can be represented by, for example, a general formula of $Li_{2+v}Na_{2-w}M1_xTi_{6-y-z}Nb_yM2_zO_{14+\delta}$.

In the above general formula, the subscript v varies in a range of $0 \leq v < 4$ according to the state-of-charge of the orthorhombic Na-containing niobium-titanium composite oxide. Should be noted that the orthorhombic Na-containing niobium-titanium composite oxide can take a value of $0 \leq v \leq 0.2$, in the discharged state.

In the above general formula, the subscript w takes a value which is greater than 0 and is less than 2. The subscript w is an index of the amount of Na in the orthorhombic Na-containing niobium-titanium composite oxide. In the orthorhombic Na-containing niobium-titanium composite oxide, the insertion and extraction potential of Li can be adjusted by the amount of Na included therein. That is, by changing the value of the subscript w in the above general formula, the operating potential of the orthorhombic Na-containing niobium-titanium composite oxide can properly be changed.

In the above general formula, M1 is at least one selected from the group consisting of Cs, K, Mg, Sr, Ba and Ca. M1 may be one selected from the group consisting of Cs, K, Mg, Sr, Ba and Ca, or may be a combination of two or more of these. By including Cs, the orthorhombic Na-containing niobium-titanium composite oxide can realize more excellent cycle characteristics. By including K, the orthorhombic Na-containing niobium-titanium composite oxide can realize more excellent cycle characteristics. By including Mg, the orthorhombic Na-containing niobium-titanium composite oxide can realize more excellent cycle characteristics. By including Sr, the orthorhombic Na-containing niobium-titanium composite oxide can realize more excellent rate characteristics. By including Ba, the orthorhombic Na-containing niobium-titanium composite oxide can realize more excellent rate characteristics. By including Ca, the orthorhombic Na-containing niobium-titanium composite oxide can realize more excellent rate characteristics. It is preferable that M1 includes at least one of Sr and Ba.

In the above general formula, the subscript x can take, for example, a value of 0≤x<2. The orthorhombic Na-containing niobium-titanium composite oxide including M1 such that the subscript x is in the range of 0≤x<2 can easily have a single-phase crystal phase. Moreover, in such a composite oxide, the Li diffusion in the solid is sufficient, and sufficient input-and-output characteristics can be obtained. It is preferable that the subscript x takes a value in a range of 0.05 to 0.2. The orthorhombic Na-containing niobium-titanium composite oxide in which the subscript x is in this range can exhibit more excellent rate characteristics. Alternatively, the orthorhombic Na-containing niobium-titanium composite oxide may not include M1.

In the above general formula, the subscript y can take a value of 0<y<2. The orthorhombic Na-containing niobium-titanium composite oxide represented by the above general formula in which the subscript y is greater than 0 can realize a higher reversible capacity. In addition, the orthorhombic Na-containing niobium-titanium composite oxide represented by the above general formula in which the value of subscript y is less than 2 can easily have a single-phase crystal phase. Moreover, in this composite oxide, the Li diffusion in the solid is sufficient, and sufficient input-and-output characteristics can be obtained. Preferably, 0.1≤y≤0.8. In addition, the orthorhombic Na-containing niobium-titanium composite oxide represented by the above general formula in which the value of subscript y is in a range of 0.1 to 0.8 can sufficiently provide a reversible charge-and-discharge capacity, and can realize sufficient input-and-output characteristics. It is preferable that the subscript y takes a value in a range of 0.1 to 1. The orthorhombic Na-containing niobium-titanium composite oxide represented by the above general formula in which the value of subscript y is in this range can exhibit more excellent rate characteristics.

In the above general formula, M2 is at least one selected from the group consisting of Zr, Sn, V, Ta, Mo, W, Fe, Co, Mn and Al. M2 may be one selected from the group consisting of Zr, Sn, V, Ta, Mo, W, Fe, Co, Mn and Al, or may be a combination of two or more of these. By including Zr, the orthorhombic Na-containing niobium-titanium composite oxide can realize more excellent cycle characteristics. By including Sn, the orthorhombic Na-containing niobium-titanium composite oxide can realize more excellent rate characteristics. V and Ta can exhibit the same physical and chemical properties as those of Nb. By including Mo, the orthorhombic Na-containing niobium-titanium composite oxide can realize more excellent rate characteristics. By including W, the orthorhombic Na-containing niobium-titanium composite oxide can realize more excellent rate characteristics. By including Fe, the orthorhombic Na-containing niobium-titanium composite oxide can realize more excellent cycle characteristics. By including Co, the orthorhombic Na-containing niobium-titanium composite oxide can realize more excellent cycle characteristics. By including Mn, the orthorhombic Na-containing niobium-titanium composite oxide can realize more excellent cycle characteristics. By including Al, the orthorhombic Na-containing niobium-titanium composite oxide can realize more excellent rate characteristics. It is more preferable that M2 includes at least one selected from the group consisting of Al, Zr, Sn and V. In another preferable mode, M2 is at least one selected from the group consisting of Sn, V, Ta, Mo, W, Fe, Co and Mn. Alternatively, the orthorhombic Na-containing niobium-titanium composite oxide may not include M2.

In the above general formula, the subscript z can take, for example, a value of 0≤z<3. If the orthorhombic Na-containing niobium-titanium composite oxide includes M2 such that the subscript z is less than 3, the orthorhombic Na-containing niobium-titanium composite oxide can easily have a single-phase crystal phase. Moreover, in such a composite oxide, the Li diffusion in the solid is sufficient, and sufficient input-and-output characteristics can be obtained. It is preferable that the subscript z takes a value in a range of 0.1 to 0.3. The orthorhombic Na-containing niobium-titanium composite oxide represented by the above general formula in which the value of subscript z is in this range can exhibit more excellent rate characteristics.

The subscript δ can take, for example, a value of −0.5≤δ≤0.5. The orthorhombic Na-containing niobium-titanium composite oxide represented by the above general formula in which the value of subscript δ is in this range can exhibit excellent charge-and-discharge cycle characteristics. In addition, such a composite oxide can take a state of a single-phase crystal phase, and can suppress a generation amount of impurities. It is preferable that the subscript δ takes a value of −0.1≤δ≤0.1. The orthorhombic Na-containing niobium-titanium composite oxide represented by the above general formula in which the value of subscript δ is in this range can exhibit more excellent rate characteristics and more excellent cycle characteristics.

The subscripts v, w, x, y, z and δ in the above general formula can take values in the above-described ranges. However, the values of the respective subscripts can be selected in combination such that the composite oxide represented by this general formula can exhibit charge neutrality.

The orthorhombic Na-containing niobium-titanium composite oxide can have, for example, a shape of particles. The particles of the orthorhombic Na-containing niobium-titanium composite oxide may be primary particles, or may be secondary particles as an agglomerate of the primary particles. Alternatively, the particles of the orthorhombic Na-containing niobium-titanium composite oxide may be a mixture of the primary particles and secondary particles. Moreover, carbon may be attached to the surfaces of the particles of the orthorhombic Na-containing niobium-titanium composite oxide. Carbon may be attached to the surfaces of the primary particles, or may be attached to the surfaces of the secondary particles. Alternatively, the particles of the orthorhombic Na-containing niobium-titanium composite oxide may include secondary particles which are formed by agglomeration of primary particles, to the surfaces of which carbon is attached. Since carbon is present between the primary particles in such second particles, the secondary particles can exhibit an excellent electrical conductivity. According to the aspect in which such secondary particles are included, the negative electrode active material-containing layer can exhibit a lower resistance, thus is preferable.

An average primary particle size of the particles of the orthorhombic Na-containing niobium-titanium composite oxide is preferably in a range of 0.5 μm to 3 μm, and is more preferably in a range of 0.9 μm to 2 μm. An average secondary particle size of the particles of the orthorhombic Na-containing niobium-titanium composite oxide is preferably in a range of 5 μm to 20 μm, and is more preferably in a range of 8 μm to 12 μm. These preferable particle sizes are particle sizes of particles including no carbon. As regards particles including carbon, an average primary particle size is preferably in a range of 0.8 μm to 3 μm, and is more preferably in a range of 1 μm to 2 μm. An average secondary particle size is preferably in a range of 5 µm to 25 µm, and is more preferably in a range of 8 µm to 15 µm.

When the particles of the orthorhombic Na-containing niobium-titanium composite oxide is a mixture of the primary particles and secondary particles, an average particle size is preferably in a range of 3 µm to 10 µm, and is more preferably in a range of 4 µm to 7 µm.

In the meantime, as the average primary particle size of the particles included in the negative electrode active material-containing layer becomes smaller, a pore diameter in the negative electrode active material-containing layer can be made smaller. The same applies to the secondary particles. That is, as the average secondary particle size of the particles included in the negative electrode active material-containing layer becomes smaller, a pore diameter in the negative electrode active material-containing layer can be made smaller. In addition, by adjusting the particle size distribution of the primary particles and/or secondary particles, the porosity of the negative electrode active material-containing layer can be adjusted. For example, by including, in the negative electrode active material-containing layer, particles with an average particle size of about 1 µm and particles with an average particle size of about 10 µm, the particles with the smaller particle size can fill the pores among the particles with the greater particle size. Thereby, the porosity of the negative electrode active material-containing layer can be reduced. From the above standpoint, it is preferable that the orthorhombic Na-containing niobium-titanium composite oxide included in the negative electrode active material-containing layer is a mixture of the primary particles and secondary particles. In the electrode according to such a preferable aspect, the negative electrode active material-containing layer includes the small primary particles and large secondary particles. Thus, the negative electrode active material-containing layer can have a less porosity, and can realize a closer contact among the particles of the orthorhombic Na-containing niobium-titanium composite oxide.

For example, a titanium oxide can be used as other negative electrode active materials than the Na-containing niobium-titanium composite oxide having the orthorhombic crystal structure. The titanium oxide is not particularly limited if lithium can be inserted into it and can be extracted from it. For instance, use can be made of a spinel-type lithium titanate, a ramsdellite-type lithium titanate, a niobium-titanium composite oxide which has a crystal structure other than the orthorhombic crystal structure or which does not include Na, a titanium-containing metal composite oxide, a niobium oxide or a composite oxide thereof, a titanium dioxide ($TiO_2(B)$) having a monoclinic crystal structure, and an anatase-type titanium dioxide.

Examples of the spinel-type lithium titanate include $Li_{4+x1}Ti_5O_{12}$ (x1 varies within a range of $-1 \leq x1 \leq 3$ according to a charge-and-discharge reaction). Examples of the ramsdellite-type lithium titanate include $Li_{2+y1}Ti_3O_7$ (y1 varies within a range of $-1 \leq y1 \leq 3$ according to a charge-and-discharge reaction). Examples of $TiO_2(B)$ and anatase-type titanium dioxide include $Li_{1+z1}TiO_2$ (z1 varies within a range of $-1 \leq z1 \leq 0$ according to a charge-and-discharge reaction).

Examples of the niobium-titanium composite oxide which has a crystal structure other than an orthorhombic crystal structure or which does not include Na include a compound group represented by, for example, $Li_{x2}Ti_{1-y2}M\alpha_{y2}Nb_{2-z2}M\beta_{z2}O_7$. Here, x2 is a value which varies within a range of $0 \leq x2 \leq 5$ according to a charge-and-discharge reaction. In addition, Mα is at least one selected from the group consisting of Zr, Si and Sn, mβ is at least one selected from the group consisting of V, Ta and Bi, y2 is a value which satisfies $0 \leq y2 < 1$, and z2 is a value which satisfies $0 \leq z2 \leq 2$. This compound group includes, for example, a niobium-titanium composite oxide having a monoclinic crystal structure (e.g. $Li_{x2}TiNb_2O_7$ ($0 \leq x \leq 5$)). In the above general formula, Ma may be one selected from the group consisting of Zr, Si and Sn, or may be a combination of two or more selected from the group consisting of Zr, Si and Sn. In addition, Mβ may be one selected from the group consisting of V, Ta and Bi, or may be a combination of two or more selected from the group consisting of V, Ta and Bi.

Examples of the titanium-containing metal composite oxide include a metal composite oxide containing Ti and at least one element selected from the group consisting of P, V, Sn, Cu, Ni and Fe. Examples of the metal composite oxide containing Ti and at least one element selected from the group consisting of P, V, Sn, Cu, Ni and Fe include $TiO_2$—$P_2O_5$, $TiO_2$—$V_2O_5$, $TiO_2$—$P_2O_5$—$SnO_2$, and $TiO_2$—$P_2O_5$-MeO (Me is at least one element selected from the group consisting of Cu, Ni and Fe).

Another example of the titanium-containing metal composite oxide is a composite oxide having a composition represented by $Li_2Na_2Ti_6O_{14}$ or $Li_2SrTi_6O_{14}$.

It is preferable that such metal composite oxides have a micro-structure with low crystallinity, in which a crystal phase and an amorphous phase coexist, or an amorphous phase exists singly. By virtue of the micro-structure, the cycle performance can further be enhanced.

The above-described other negative electrode active material can have a shape of particles, like the Na-containing niobium-titanium composite oxide having the orthorhombic crystal structure. The particles may be primary particles, secondary particles, or a mixture of the primary particles and secondary particles. As regards the particles of the negative electrode active material including the Na-containing niobium-titanium composite oxide having the orthorhombic crystal structure, and other negative electrode active material, an average primary particle size of the primary particles is preferably in a range of 10 nm to 10 µm, and is more preferably in a range of 50 nm to 5 µm. An average secondary particle size of the secondary particles is preferably in a range of 500 nm to 50 µm, and is more preferably in a range of 1 µm to 20 µm.

The conductive agent can enhance a current collection performance and can exhibit a function of suppressing contact resistance between the active material and current collector. Examples of the conductive agent include carbonaceous substances such as acetylene black, carbon black, graphite, carbon nanofiber, carbon nanotube, and coke. Among these, graphite and carbon nanofiber are preferable. Compared to the acetylene black and carbon black, the graphite and carbon nanofiber tend to easily enter the gaps among the particles of the orthorhombic Na-containing niobium-titanium composite oxide, and can make smaller the pores in the electrode active material-containing layer. In addition, as the conductive agent, it is more preferable to use carbon material particles with a large aspect ratio. Here, the carbon material particles may be particles including carbon material, or may be fibers including carbon material. A preferable aspect ratio is 15 or more, and a more preferable aspect ratio is 50 or more. The carbon material particles with a large aspect ratio can impart electrical conductivity in a thickness direction of the negative electrode active material-containing layer, and can realize higher input-and-output characteristics. As the conductive agent, one of the above-described carbonaceous substances may be used singly, or plural carbonaceous substances may be used.

The binder can have a function of binding the active material, conductive agent and current collector. As the binder, for example, at least one selected from the group consisting of the following can be used: polytetrafluoroethylene (PTFE), polyvinylidene fluoride (PVdF), a cellulose-based compound such as sodium carboxymethylcellulose (Na salt of CMC), fluorine-based rubber, styrene-butadiene rubber, acrylic resin or a copolymer thereof, polyacrylic acid, and polyacrylonitrile. However, the binder is not limited to these.

In the negative electrode active material-containing layer, it is preferable that the negative electrode active material, the conductive agent and the binder are blended at a ratio of 70% by mass to 96% by mass, 2% by mass to 28% by mass, and 2% by mass to 28% by mass, respectively. It is preferable that the negative electrode active material is included at an amount of 85% by mass to 93% by mass. By including the conductive agent at an amount of 2% by mass or more, the negative electrode active material-containing layer can be provided with a sufficient current collection performance, and thereby more excellent large-current characteristics can be realized. In addition, by including the binder at an amount of 2% by mass or more, an excellent binding property can be provided between the negative electrode active material-containing layer and the negative electrode current collector, and thereby excellent cycle characteristics can be realized. From the standpoint of enhancement in capacity, it is preferable that the amount of each of the conductive agent and binder is 28% by mass or less. It is more preferable that the negative electrode active material, the conductive agent and the binder are blended at a ratio of 85% by mass to 96% by mass, 2% by mass to 13% by mass, and 2% by mass to 13% by mass, respectively.

The density of the negative electrode active material-containing layer is preferably within a range of 2.4 g/cm$^3$ to 2.7 g/cm$^3$, and is more preferably within a range of 2.5 g/cm$^3$ to 2.6 g/cm$^3$. In the electrode in which the density of the negative electrode active material-containing layer is within the preferable range, the contact among the particles of the orthorhombic Na-containing niobium-titanium composite oxide is sufficient, and thus the negative electrode active material-containing layer can exhibit a more excellent electron conductivity. Furthermore, a sufficient space can be secured for impregnation of the nonaqueous electrolyte.

The negative electrode can be manufactured, for example, by fabricating a battery unit by using a negative electrode intermediate member that is fabricated by the following procedure, and by subjecting this battery unit to aging, as will be described later.

The negative electrode intermediate member can be fabricated, for example, by the following procedure. To start with, the above-described negative electrode active material, conductive agent and binder are provided. The method of synthesizing the Na-containing niobium-titanium composite oxide having the orthorhombic crystal structure will be described later. Next, these are suspended in a proper solvent. At this time, if the stirring speed becomes excessively high, the secondary particles can be collapsed. Thus, it is preferable that the stirring speed is relatively low. The slurry thus obtained is coated on one surface or both surfaces of the current collector such as an aluminum foil, and then a coated film is dried. Then, the dried coated film, together with the current collector, is pressed. Thus, a negative electrode intermediate member including the negative electrode current collector and the negative electrode active material-containing layer, which is supported on the negative electrode current collector, can be obtained. The obtained negative electrode intermediate member has, for example, a strip shaped. Alternatively, the negative electrode may be fabricated by forming the negative electrode active material, conductive agent and binder in a pellet shape as a negative electrode active material-containing layer, and providing this negative electrode active material-containing layer on the current collector.

3) Nonaqueous Electrolyte

The nonaqueous electrolyte may be, for example, a liquid nonaqueous electrolyte or gel nonaqueous electrolyte. The liquid nonaqueous electrolyte can be prepared by dissolving an electrolyte in an organic solvent. The gel nonaqueous electrolyte can be prepared by mixing a liquid nonaqueous electrolyte and a polymer material to obtain a composite. The nonaqueous electrolyte may include an additive.

For the liquid nonaqueous electrolyte, the concentration of the electrolyte dissolved in the organic solvent is preferably within a range of 0.5 mol/L to 2.5 mol/L.

Examples of the electrolyte include lithium salts such as lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluoromethanesulfonate ($LiCF_3SO_3$), and lithium bistrifluoromethylsulfonylimide [$LiN(CF_3SO_2)_2$], and mixture thereof. The electrolyte is preferably one which is hard to be oxidized even at a high electric potential, and most preferably $LiPF_6$.

Examples of the organic solvent include cyclic carbonates such as propylene carbonate (PC), ethylene carbonate (EC), and vinylene carbonate; linear carbonates such as diethyl carbonate (DEC), dimethyl carbonate (DMC), and methylethyl carbonate (MEC); cyclic ethers such as tetrahydrofuran (THF), 2-methyltetrahydrofuran (2-MeTHF), and dioxolane (DOX); linear ethers such as dimethoxyethane (DME), and diethoxyethane (DEE); acetonitrile (AN), and sulfolane (SL). One of these organic solvents may be used alone, or two or more of these solvents may be used as a mixed solvent.

The organic solvent is preferably a mixed solvent which is obtained by mixing two or more selected from the group consisting of propylene carbonate (PC), ethylene carbonate (EC), diethyl carbonate (DEC), dimethyl carbonate (DMC), and methylethyl carbonate (MEC). The cyclic carbonate is preferable because lithium salts can be dissociated at a high degree in the cyclic carbonate. A linear carbonate is preferable because an electrolyte solution including a linear carbonate can exhibit a low viscosity and therefor lithium can easily diffuse in the electrolyte solution. The mixed solvent including a cyclic carbonate and a linear carbonate is preferable because the mixed solvent can utilize both of these advantages.

The organic solvent preferably includes ethylene carbonate (EC). The organic solvent preferably includes ethylene carbonate in a ratio of 1% by volume or more, and more preferably in a ratio 5% by volume or more, based on the volume of the organic solvent. In other preferable aspect, the organic solvent include ethylene carbonate in a ratio of from 1% by volume to 80% by volume, and more preferably in a ratio of from 5% by volume to 50% by volume, based on the volume of the organic solvent.

Examples of the polymer material include polyvinylidene fluoride (PVdF), polyacrylonitrile (PAN), and polyethylene oxide (PEO).

Alternatively, the nonaqueous electrolyte may be an ordinary-temperature molten salt (ionic melts) containing Li ions.

The ordinary-temperature molten salt (ionic melt) means compounds which can exist in a liquid state at ordinary temperature (15 to 25° C.), among organic salts constituted of combinations of organic cations and anions. The ordinary-temperature molten salt includes an ordinary-temperature molten salt which exists alone as a liquid, an ordinary-temperature molten salt which becomes a liquid after being mixed with an electrolyte, and an ordinary-temperature molten salt which becomes a liquid after being dissolved in an organic solvent. In general, the melting point of the ordinary-temperature molten salt used in nonaqueous electrolyte batteries is 25° C. or below. The organic cations generally have a quaternary ammonium skeleton.

The polymer solid electrolyte is prepared by dissolving the electrolyte in a polymeric material, and solidifying it.

The inorganic solid electrolyte is a solid substance having lithium ion conductivity.

Note that, by aging, which will be described below in detail, of a battery unit, a part of the nonaqueous electrolyte may be decomposed. Therefore, a nonaqueous electrolyte included in a nonaqueous electrolyte battery completed after the aging may have a composition different from that of a nonaqueous electrolyte which is as-prepared before it is included in a battery unit.

4) Separator

The separator may be provided between the positive electrode and the negative electrode.

As the separator, for example, a porous film or synthetic resin nonwoven fabric, containing at least one selected from the group consisting of polyethylene, polypropylene, polyethylene terephthalate, cellulose, and polyvinylidene fluoride (PVdF) can be used. Alternatively, a separator in which an inorganic compound is applied on the porous film can be used.

5) Container Member

As the container member, for example, a container made of a laminate film or a metallic container can be used.

As the shape thereof, the flat shape (slim shape), prismatic shape, cylindrical shape, coin shape, button shape, sheet shape, and stack shape can be cited. The container member may have a size depending on the size of the battery. For example, the container member may have a size for a compact battery mounted on mobile electronic devices, and a large battery mounted on two- to four-wheel automobiles.

As the laminate film, for example, a multilayer film in which a metal layer is sandwiched between resin films can be used. The thickness of the laminate film is preferably 0.2 mm or less. The metal layer is preferably aluminum foil or aluminum alloy foil to reduce the weight thereof. As the resin film, for example, a polymeric material such as polypropylene (PP), polyethylene (PE), nylon, and polyethylene terephthalate (PET) can be used. The laminate film can be formed into the shape of a container member by performing heat sealing.

The wall thickness of the metallic container is preferably 0.5 mm or less, and more preferably 0.2 mm or less.

The metallic container can be formed from, for example, aluminum or an aluminum alloy. The aluminum alloy preferably contains an element such as magnesium, zinc, or silicon. On the other hand, the content of transition metal such as iron, copper, nickel, and chromium in the alloy is preferably reduced to 100 ppm or less. Whereby, long-term reliability and heat dissipation properties under a high-temperature environment can be remarkably improved.

(6) Positive Electrode Terminal

The positive electrode terminal is preferably formed from a material that is electrically stable at a potential in the range of 3 V (vs. Li/Li$^+$) to 4.5 V (vs. Li/Li$^+$) with respect to the redox potential of lithium and has an electric conductivity. More specifically, the positive electrode terminal is preferably formed from aluminum or an aluminum alloy containing an element such as Mg, Ti, Zn, Mn, Fe, Cu, and Si. To reduce contact resistance with the positive electrode current collector, the positive electrode terminal is preferably formed from a material similar to that of the positive electrode current collector.

(7) Negative Electrode Terminal

The negative electrode terminal is preferably formed from a material that is electrically stable at a potential in the range of 0.4 V (vs. Li/Li$^+$) to 3 V (vs. Li/Li$^+$) with respect to the redox potential of lithium and has an electric conductivity. More specifically, the negative electrode terminal is preferably formed from aluminum or an aluminum alloy containing an element such as Mg, Ti, Zn, Mn, Fe, Cu, and Si. To reduce contact resistance with the negative electrode current collector, the negative electrode terminal is preferably formed from a material similar to that of the negative electrode current collector.

[Method of Synthesizing the Na-Containing Niobium-Titanium Composite Oxide Having Orthorhombic Crystal Structure]

The Na-containing niobium-titanium composite oxide having the orthorhombic crystal structure can be synthesized, for example, by the following procedure.

When the Na-containing niobium-titanium composite oxide having the orthorhombic crystal structure is synthesized, if the mixture ratio of raw materials is set to be such a ratio that the respective elements are included in stoichiometric quantities of an object composition, not only the single-phase orthorhombic Na-containing niobium-titanium composite oxide, but also impurities such as $TiO_2$ can be synthesized. It is thought that the reason for this is that lithium and sodium are evaporated and lost due to heat treatment. In particular, the influence on battery characteristics by the loss of lithium is great.

One method for solving this problem is to make the amount of lithium or the like, which is mixed as raw material, greater than the stoichiometric ratio. However, in this method, lithium which does not contribute to synthesis may remain, even if heat treatment is performed. Excess lithium which did not contribute to synthesis may not be taken into the crystal phase of the object composition, and such excess lithium may be present on particle surfaces as impurities. If the excess lithium is present on particle surfaces as impurities, there is concern that a decomposition reaction of the nonaqueous electrolyte may occur on particle surfaces by this lithium, and an interface resistance between the electrode and electrolyte may increase.

As regards this problem, as will be described below, excess lithium, which remains on active material particle surfaces after heat treatment, is eliminated. Thereby, the above-described nonaqueous electrolyte decomposition reaction can be suppressed. Due to the suppression of this side reaction, the life characteristics are improved, and the resistance can be reduced, and therefore the rate characteristics are also improved.

In the above, the case was described in which the mixing ratio of raw materials is made greater than the stoichiometric ratio of the object composition. However, the mixing ratio of raw materials may be identical to the stoichiometric ratio of the object composition. In this case, too, after the heat treatment, there may exist lithium which is not taken into the crystal phase of the object composition. Thus, by eliminating such lithium, the life characteristics are improved.

The orthorhombic Na-containing niobium-titanium composite oxide can be synthesized by, for example, a solid-state method. Alternatively, the orthorhombic Na-containing niobium-titanium composite oxide can be synthesized by a wet-type synthesis method such as a sol-gel method or a hydrothermal method. By the wet-type synthesis, fine particles can obtained more easily than the solid-state method.

Hereinafter, a description will be given of an example of the synthesis method of the orthorhombic Na-containing niobium-titanium composite oxide according to the solid-state method.

To start with, in accordance with an object composition, necessary raw materials are provided from the group consisting of a Ti source, Li source, Na source, Nb source, metal element M1 source and metal element M2 source. These raw materials can be, for example, compounds such as oxides and salts. These salts are preferably salts such as carbonates and nitrates which are decomposed at relatively low temperatures to form oxides.

Next, the provided raw materials are mixed at a proper stoichiometric ratio to obtain a mixture. For example, when the Na-containing niobium-titanium composite oxide which is represented by a composition formula of $Li_2Na_{1.7}Ti_{5.7}Nb_{0.3}O_{14}$, and has an orthorhombic crystal structure is synthesized, a titanium oxide $TiO_2$, a lithium carbonate $Li_2CO_3$, a sodium carbonate $Na_2CO_3$ and a niobium (V) hydroxide $Nb(OH)_5$ are mixed such that the mole ratio of Li:Na:Ti:Nb in the mixture becomes 2:1.7:5.7:0.3. Should be noted that, since Li and Na may lost due to heat treatment, as described above, these may be mixed more than the stoichiometric ratio of the object composition. In particular, since there is concern that Li is lost during heat treatment, Li may be mixed more than the stoichiometric ratio of the object composition.

When the raw materials are mixed, it is preferable that these raw materials are mixed after sufficiently ground. By mixing the sufficiently ground raw materials, the reactions among the raw materials can easily occur, and the generation of impurities can be suppressed.

Next, the mixture obtained by the preceding mixing is subjected to treat treatment for 1 hour to 24 hours at temperatures of 800° C. to 1000° C. in an air atmosphere. It is possible that the mixture is not fully crystallized at temperatures below 800° C. At temperatures above 1000° C., it is possible that particle growth excessively progresses and rough particles are formed, and this is not preferable. In addition, if the heat treatment time is less than one hour, it is possible that crystallization does not sufficiently occur. If the heat treatment time is longer than 24 hours, it is possible that particle growth excessively progresses and rough particles are formed, and this is not preferable.

It is preferable that this heat treatment is performed for 2 hours to 5 hours at temperatures of 850° C. to 950° C. Thus, the orthorhombic Na-containing niobium-titanium composite oxide can be obtained. In addition, anneal treatment may be performed after recovering the obtained orthorhombic Na-containing niobium-titanium composite oxide.

For example, the orthorhombic Na-containing niobium-titanium composite oxide which is represented by the composition formula of $Li_2Na_{1.7}Ti_{5.7}Nb_{0.3}O_{14}$ can be obtained by subjecting the mixture, which was obtained by mixing the raw materials as described above, to heat treatment over 3 hours at 900° C. in an air atmosphere.

Next, the orthorhombic Na-containing niobium-titanium composite oxide which was obtained by the heat treatment is subjected to grinding using a wet-type ball mill using an aqueous solution to wash the surfaces of the active material particles. By this washing, the excess lithium adhering to the surfaces of the active material particles can be washed away.

As the aqueous solution, for example, an acidic aqueous solution can be used. The acidic aqueous solution is, for example, an aqueous solution including hydrochloric acid or sulfuric acid. Instead of the aqueous solution, water may be used. Since the pH increases due to the excess lithium on the particle surfaces, the use of the acidic aqueous solution is preferable for sufficient washing.

The above washing may also be performed by grinding by a dry mill which does not use the aqueous solution. In addition, the above washing can be performed, without grinding, by immersing the orthorhombic Na-containing niobium-titanium composite oxide into an aqueous solution.

Subsequently, the washed active material particles are subjected to reheat treatment. By the reheat treatment, the composition near the surfaces of the active material particles can be crystallized. The temperatures of the reheat treatment are, for example, 500° C. to 900° C., and are preferably 600° C. to 700° C. If the temperatures of the reheat treatment are lower than 500° C., the poor crystallinity of the particle surfaces may be obtained. If the temperatures of the reheat treatment are above 900° C., it is possible that the particles grow.

By the above-described procedure, the example of the Na-containing niobium-titanium composite oxide having the orthorhombic crystal structure can be synthesized.

[Manufacturing Method]

The nonaqueous electrolyte battery according to the first embodiment can be manufactured, for example, by the following method.

To begin with, by the above-described procedures, the positive electrode and the negative electrode intermediate member are fabricated. Next, an electrode group is fabricated by using the fabricated positive electrode, negative electrode intermediate member, and the separator. Next, the positive electrode of the electrode group is electrically connected to the positive electrode terminal. On the other hand, the negative electrode of the electrode group is electrically connected to the negative electrode terminal.

Next, the electrode group is accommodated in the container member. Then, the nonaqueous electrolyte is accommodated in the container member. Thus, the nonaqueous electrolyte is held by the electrode group. Subsequently, the container member is closed to seal the electrode group and nonaqueous electrolyte in the container member. Thus, the battery unit is obtained.

This battery unit is subjected to aging including a first aging and a second aging. The first aging is performed prior to the second aging. The temperature in the first aging is set to be lower than the temperature in the second aging. In addition, the battery voltage of the battery unit to be subjected to the first aging is set to be lower than the battery voltage of the battery unit to be subjected to the second aging.

Specifically, the temperature of the first aging is preferably within a range of 35° C. to 95° C., and is more preferably within a range of 50° C. to 70° C. In addition, the first aging is performed preferably for 0.5 hour to 48 hours, and more preferably for 5 hours to 24 hours. Besides, the battery voltage of the battery unit to be subjected to the first aging is preferably within a range of 1.8 V to 2.65 V, and is more preferably within a range of 2.4 V to 2.6 V.

The temperature of the second aging is preferably within a range of 40° C. to 120° C., and is more preferably within a range of 70° C. to 100° C. In addition, the second aging is performed preferably for 1 hour to 48 hours, and more preferably for 5 hours to 24 hours. Besides, the battery voltage of the battery unit to be subjected to the second aging is preferably within a range of 2.7 V to 3.0 V, and is more preferably within a range of 2.7 V to 2.9 V. However, as described above, the temperature of the second aging is higher than the temperature of the first aging. In addition, the battery voltage of the battery unit to be subjected to the second aging is higher than the battery voltage of the battery unit to be subjected to the first aging.

It is preferable that the first aging is performed for the battery unit which is in the state in which an internal gas can be released. Alternatively, after the first aging and/or second aging, a gas-releasing from the battery unit may be performed.

The battery voltage of the battery unit to be subjected to the first aging is adjusted in the following manner. To begin with, the battery unit is fabricated by the above-described procedure. Then, the fabricated battery unit is charged at a constant current of 5 C or less until the battery voltage reaches a predetermined voltage. Thus, the battery unit to be subjected to the first aging can be prepared.

In addition, the SOC of the battery unit to be subjected to the second aging is adjusted in the following manner. After the end of the first aging and arbitrary gas-releasing, the battery unit is discharged at a constant current until the battery voltage reaches 1.8 V. Then, the battery unit is charged at a constant current of 5 C or less until the battery voltage reaches a predetermined voltage.

By subjecting the battery unit to the above-described first aging and second aging, a film can be formed, although the reason is unclear, on the surface of the negative electrode active material-containing layer included in the negative electrode intermediate member, and the negative electrode active material-containing layer satisfies $I_2/I_1 \geq 1$, which was described above. Specifically, by subjecting the battery unit to the above-described first aging and second aging, the nonaqueous electrolyte battery according to the first embodiment can be obtained. As specific examples, Examples will be described in a latter part of the present specification.

On the other hand, when only the first aging was performed or only the second aging was performed, $I_2/I_1$ becomes less than 1, as will be exemplified in Comparative Examples. In addition, also when the first aging was performed after the end of the second aging, $I_2/I_1$ becomes less than 1, as will be exemplified in Comparative Examples.

Furthermore, even if the first aging and second aging are performed, $I_2/I_1$ may be less than 1, as will be exemplified in Comparative Examples, depending on, for example, the composition of the nonaqueous electrolyte. However, although the description is repeated, the nonaqueous electrolyte battery according to the first embodiment can be obtained by procedures described as specific examples in the Examples.

If the first aging and second aging were performed, further aging can also be performed thereafter.

[Various Analysis Methods]

Hereinafter, a description will be given of analysis methods of the negative electrode active material-containing layer included in the negative electrode included in the nonaqueous electrolyte battery, and analysis methods of the active material included in the negative electrode active material.

(Preparation of Measurement Samples)

To begin with, measurement samples are prepared by the following procedure.

A nonaqueous electrolyte battery to be analyzed is provided. As the battery to be analyzed, a battery having a capacity of 80% or more of a nominal capacity is provided.

Next, the nonaqueous electrolyte battery is set in the discharge state. For example, the nonaqueous electrolyte battery is discharged at a constant current of 5 C or less until the battery voltage reaches 1.8 V, and thereby, the nonaqueous electrolyte battery can be set in the discharge state.

Next, the nonaqueous electrolyte battery is transferred into a glove box which is filled with argon, and is disassembled therein. Subsequently, the negative electrode is taken out from the disassembled battery. The taken-out negative electrode is washed with, for example, ethyl methyl carbonate (EMC). By this washing, a Li salt adhering to the surface of the negative electrode can be removed. Next, the washed negative electrode is dried. Thus, a negative electrode sample, which is a measurement sample, can be obtained.

(Analysis by XPS of Negative Electrode Active Material-Containing Layer)

XPS measurement can be performed, for example, by a method to be described below.

As an apparatus, the PHI Quantera SXM manufactured by ULVAC-PHI, Inc is used. As an excitation X-ray source, Al-Kα ray (1486.6 eV) split by a single crystal is used, and the photoelectron detection angle is set at 45°.

The negative electrode sample, which was prepared as described above, is attached to a sample holder of the XPS analysis apparatus. The sample is transferred in an inert atmosphere, for example, in an argon atmosphere.

<Quantitative Determination of Elements Included in Negative Electrode Active Material>

The elements included in the negative electrode active material can be analyzed by using, in combination, Inductively Coupled Plasma (ICP) emission spectrometry, Scanning Electron Microscope (SEM) observation, and Energy Dispersive X-ray spectrometry (EDX).

(ICP Analysis Procedure)

A part of the negative electrode sample, which was prepared as described above, is put in a proper solvent, and ultrasonic is radiated. For example, the electrode sample is put into ethyl methyl carbonate in a glass beaker, and is vibrated in an ultrasonic washer, and thereby, the negative electrode active material-containing layer can be separated from the current collector. Next, the separated negative electrode active material-containing layer is dried by reduced-pressure drying. The obtained negative electrode active material-containing layer is ground in a mortar or the like, thus forming particles including components such as the negative electrode active material, conductive agent, binder and surface film. By dissolving the particles by an acid, a liquid sample including the negative electrode active material can be formed. At this time, as the acid, hydrochloric acid, nitric acid, sulfuric acid, hydrogen fluoride, or the like can be used. By subjecting this liquid sample to ICP emission spectrometry, the metal elements included in the negative electrode active material can be quantitatively determined.

(Procedure of SEM-EDX Analysis)

The negative electrode sample prepared as described above is cut-out with an ion milling devices to obtain the cross-section of the sample. The cut-out cross-section of the sample is observed with a scanning electron microscope. Sampling is performed in an inert atmosphere such as argon or nitrogen without being exposed to the air.

Some particles are randomly selected using an SEM observation image at a magnification of 3000. In the case where it is difficult to determine the particle size at a magnification of 3000 due to the smallness of the particles, the magnification may be increased. At that time, the particles are selected so that the particle size distribution of the selected particles is as broad as possible.

Subsequently, each of the selected particles is subjected to elemental analysis by energy dispersive X-ray spectroscopy attached to the scanning electron microscope. Thus, it is possible to identify the kind and amount of elements other than Li among the elements included in each of the selected particles. As for Li, it is possible to obtain information on the content of Li in the active material included in the electrode by the inductively coupled plasma (ICP) atomic emission spectrometry described above.

By using the analysis results of the above ICP and SEM-EDX, the composition of the negative electrode active material included in the negative electrode active material-containing layer can be found. Also when the negative electrode active material is a mixture of a plural kinds of active materials, the composition of elements (excluding Li) of each active material can be found by the SEM-EDX. The ICP analysis result can be regarded as the total of metal elements included in each active material. Thus, by using the respective analysis results of the ICP and the SEM-EDX, the composition of each negative electrode active material and the mass ratio of each active material in the negative electrode active material can be found.

<Identification of Crystal Structure of Active Material by XRD>

The crystal structure of the active material included in each of the particles selected by SEM can be identified by X-ray diffraction (XRD).

The XRD measurement of the electrode can be performed by cutting the electrode to be measured into a size having the same area of the holder of the wide-angle X-ray diffractometer and directly attaching the cut electrode to the glass holder, and measuring it. At this time, XRD is measured in advance with regard to the kind of the metal foil of the electrode current collector to determine a position where a peak derived from the current collector appears. Furthermore, it is necessary to determine in advance whether or not there are peaks derived from the ingredients such as a conductive agent and binder. When the peak of the current collector is overlapped on the peak of the active material, it is desired to separate the active material from the current collector prior to the measurement. This is to separate the overlapped peaks when measuring the peak intensity quantitatively. Of course, the procedure may be omitted if these data have been found in advance. Although the electrode may be separated physically, it is easily separated by applying ultrasonic waves in a solvent. Then, the electrode thus recovered can be subjected to wide-angle X-ray diffraction for the active material.

The measurement can be performed by using Cu-Kα rays as a radiation source and setting a measurement range to a range of $10° \leq 2\theta \leq 90°$ to obtain the X-ray diffraction pattern.

As an apparatus for powder X-ray diffraction measurement, SmartLab manufactured by Rigaku is used. Measurement is performed under the following condition: Cu target; 45 kv, 200 mA; soller slit: 5 degrees in both incident light and received light; step width: 0.02 deg; scan speed: 20 deg/min; semiconductor detector: D/teX Ultra 250; sample plate holder: flat glass sample plate holder (0.5 mm in thickness); measurement range: $10° \leq 2\theta 90°$. When another apparatus is used, measurement using a standard Si powder for powder X-ray diffraction is performed to find conditions under where under there can be obtained measuring results of a peak intensity and a peak top position equivalent to the those obtained by the above apparatus, and then measurement of the sample is performed under the found conditions.

The X-ray diffraction (XRD) pattern obtained herein must be applicable to Rietveld analysis. In order to collect the data for Rietveld analysis, the measurement time or X-ray intensity is appropriately adjusted in such a manner that the step width is made ⅓ to ⅕ of the minimum half width of the diffraction peaks, and the intensity at the peak position of strongest reflected intensity is 5,000 cps or more.

The XRD pattern obtained as described above is analyzed by the Rietveld method. In the Rietveld method, the diffraction pattern is calculated from the crystal structure model which has been previously estimated. The estimation of the crystal structure is performed based on the analysis results of EDX as described above and ICP as described above. The parameters of the crystal structure (lattice constant, atomic coordinate, and occupancy ratio or the like) can be precisely analyzed by fitting all the calculated values and measurement values. Thereby, the characteristics of the crystal structure of the composite oxide can be determined. The site occupancy ratio of constitutional elements in each of the sites can be examined. A fitting parameter S is used as the scale for estimating the degree of agreement between the measured intensities and the calculated intensities in the Rietveld analysis. The S value must be less than 1.8 in the analysis. When determining the occupancies in each of the sites, the standard deviation $\sigma_j$ must be taken into consideration. The fitting parameter S and standard deviation $\sigma_j$ defined herein are estimated using the formula described in "Funmatsu X sen Kaisetsu no Jissai (Reality of Powder X-Ray Analysis)", X-Ray Analysis Investigation Conversazione, The Japan Society for Analytical Chemistry, written and edited by Izumi Nakai and Fujio Izumi (Asakura Publishing Co., Ltd.).

By the XRD analysis as described above, information on the crystal structure of the active material can be obtained.

<Measuring Method of BET Specific Surface Area of Active Material>

The BET specific surface area of the negative electrode active material can be measured, for example, by a method to be described below.

To begin with, by the same procedure as in the ICP analysis, the powder including the components such as the negative electrode active material, conductive agent and binder are taken out from the negative electrode sample which was prepared as described above. Subsequently, the powder is heated for 1 hour at 600° C., and the active material is isolated. The powder of this active material are used as a measurement sample.

The mass of the active material is to be set at 4 g. A cell for evaluation, which has a size of, e.g. ½ inch, is used. As a pretreatment method, a gas-releasing process is performed by drying this cell for evaluation under reduced pressure for 15 hours at temperatures of about 100° C. or above. As the measuring apparatus, for example, the TriStar II 3020 (manufactured by SHIMADZU Corporation and Micromeritics Instrument Corporation) is used. Nitrogen gas is adsorbed while pressure is being varied, and an adsorption isothermal curb is found by setting a horizontal axis for a relative pressure, and a vertical axis for an $N_2$ gas adsorption amount. Assuming that this curb conforms to the BET theory, the BET equation is applied, and thereby the specific surface area of the particles of the active material can be calculated.

(Method for Measuring Average Primary Particle Size and Average Secondary Particle Size of Negative Electrode Active Material)

The negative electrode sample prepared as described above is cut-out with an ion milling devices to obtain the cross-section of the sample. The cut-out cross-section of the sample is observed with a scanning electron microscope to obtain an image of the active material particles at a magnification of 3000. In the obtained field, the particle group in which primary particles are confirmed to be in contact with each other is used as secondary particles. Sampling is performed in an inert atmosphere such as argon or nitrogen without being exposed to the air.

The size of a primary particle is calculated from a diameter of the minimum circle corresponding to a primary particle. Specifically, in the SEM image at a magnification of 3000, the particle size measurement is carried out ten times and an average of the diameters of minimum circles obtained in each of the measurements is defined as a primary particle size. Maximum and minimum values of the particle sizes of ten-times measurements are not used for calculation.

The secondary particle size is measured by the same method as for the primary particles. Hence, a diameter of the minimum circle corresponding to a secondary particle is measured. Specifically, in the SEM image at a magnification of 3000, the particle size measurement is carried out ten times and an average of the diameters of minimum circles obtained in each of the measurements is defined as a secondary particle size. Maximum and minimum values of the particle sizes of ten-times measurements are not used for calculation.

In the above, the analysis methods relating to the negative electrode active material were described. However, the analysis of the positive electrode active material can be performed by the same procedures.

Next, referring to the accompanying drawings, some examples of the nonaqueous electrolyte battery according to the present embodiment will be described.

First, a flat-type nonaqueous electrolyte battery as an example of the nonaqueous electrolyte battery according to the embodiment will be described with reference to FIGS. 2 and 3.

Figure 2:
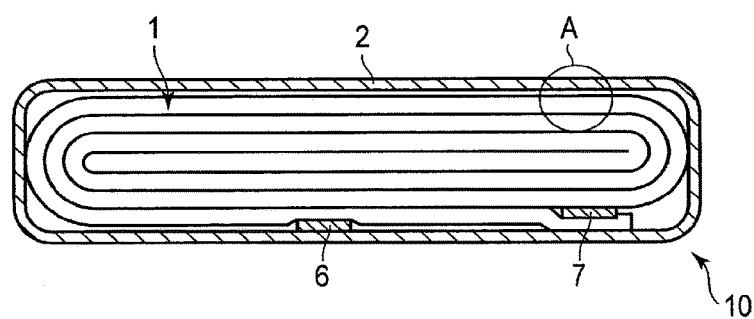
FIG. 2 is a cross-sectional view showing one example of a nonaqueous electrolyte battery according to an embodiment.

FIG. 2 is a cross-sectional schematic view showing one example of a nonaqueous electrolyte battery according to the first embodiment. FIG. 3 is an enlarged cross-sectional view showing a portion A in FIG. 2.

A nonaqueous electrolyte battery 10 shown in FIGS. 2 and 3 includes a wound electrode group 1 in a flat form.

The wound electrode group 1 in the flat form include, as shown in FIG. 3, a negative electrode 3, a separator 4 and a positive electrode 5. The separator 4 is sandwiched between the negative electrode 3 and the positive electrode 5. This wound electrode group 1 in the flat form is formed by stacking the negative electrode 3, the separator 4 and the positive electrode 5 to form a stack, and then spirally winding the stack with a part of the negative electrode 3 located in outermost layer as shown in FIG. 3, and then press-forming the wound stack. In the stack, the negative electrode 3, the separator 4 and the positive electrode 5 is stacked with the separator 4 sandwiched between the negative electrode 3 and the positive electrode 5.

The negative electrode 3 includes a negative electrode current collector 3a and a negative electrode active material-containing layer 3b. A part of the negative electrode 3 located in the outermost layer has a configuration in which the negative electrode active material-containing layer 3b is formed on one surface which is the internal surface of the negative electrode current collector 3a as shown in FIG. 3. In the other portion of the negative electrode 3, the negative electrode active material-containing layers 3b are formed on both surfaces of the negative electrode current collector 3a.

A film is formed on one surface of the negative electrode active material-containing layer 3b, which is not in contact with the current collector. However, as described above, this film has a much smaller thickness than the negative electrode active material-containing layer 3b. Thus, this film is not illustrated in FIG. 3.

The positive electrode 5 includes a positive electrode current collector 5a and positive electrode active material-containing layers 5b formed on both surfaces of the positive electrode current collector 5a.

As shown in FIG. 2, in the vicinity of the outer peripheral edge of the wound electrode group 1, a negative electrode terminal 6 is connected to the negative electrode current collector 3a at the outermost negative electrode 3, and a positive electrode terminal 7 is connected to the positive electrode current collector 5a at the inside positive electrode 5.

The wound electrode group 1 is accommodated in a bag-shaped container 2. The bag-shaped container 2 is made of a laminate film including two resin layers and a metal layer sandwiched between the resin layers.

A part of the negative electrode 6 and a part of the positive electrode 7 are located outside of the bag-shaped container 2. This state can be achieved by sandwiching the negative electrode terminal 6 and the positive electrode terminal 7 between portions of the bag-shaped container 2 which are opposed to each other at a circumference of the container 2, and then heat-sealing the portions of the container 2.

A liquid nonaqueous electrolyte is accommodated in the bag-shaped container 2. The liquid nonaqueous electrolyte is held in the electrode group 1. The liquid nonaqueous electrolyte can be injected into the bag-shaped container 2 via, for example, an opening provided on the circumference of the container 2. The opening can be provided by, for example, leaving a part unsealed when the heat-sealing of the circumference of the container 2. After injection of the nonaqueous electrolyte, the opening can be subjected to the heat-sealing, and thereby the wound electrode group 1 and the liquid nonaqueous electrolyte are completely sealed in the container 2.

Next, another example of the nonaqueous electrolyte battery according to the first embodiment will be described with reference to FIGS. 4 and 5.

FIG. 4 is a partially cutaway perspective view schematically showing another example of the nonaqueous electrolyte battery according to the first embodiment. FIG. 5 is an enlarged cross-sectional view showing a portion B in FIG. 4.

Figure 5:
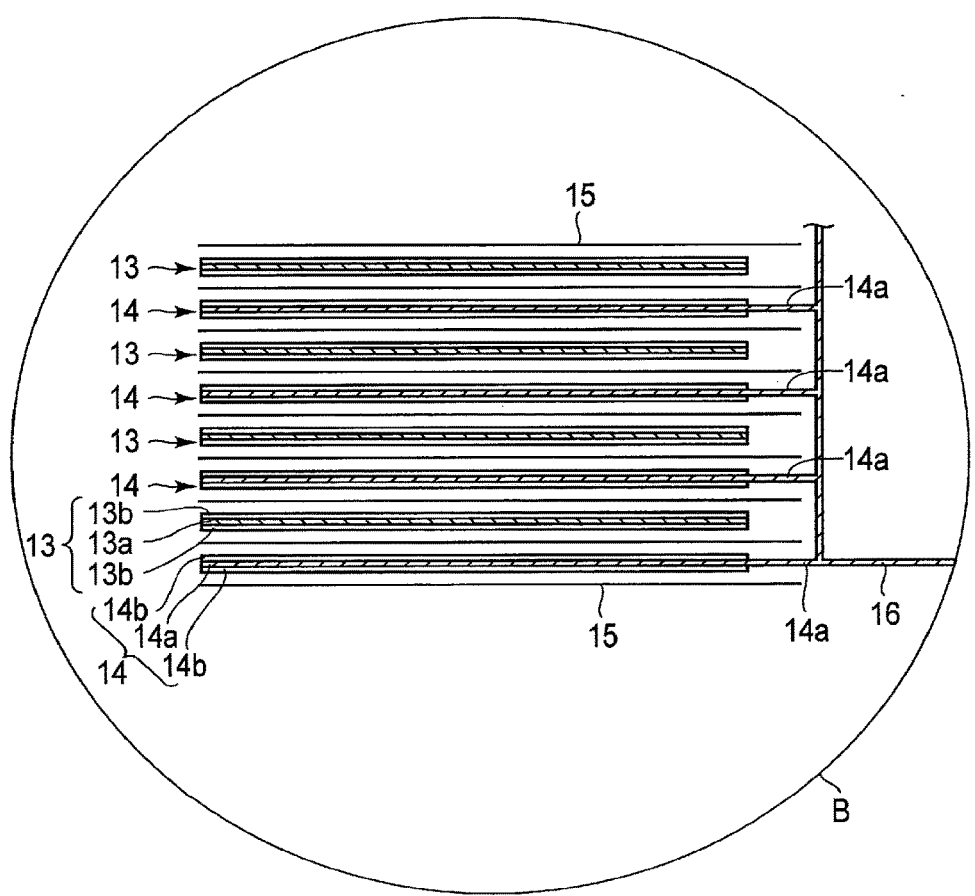
FIG. 5 is an enlarged cross-sectional view showing a portion B in FIG. 4.

A nonaqueous electrolyte battery 10 shown in FIGS. 4 and 5 includes a stack-type electrode group 11. As shown in FIG. 4, the stack-type electrode group 11 is accommodated in a container member 12 in which a metal layer is sandwiched between two resin films. As shown in FIG. 5, the stack-type electrode group 11 has a structure in which positive electrodes 13 and negative electrodes 14 are alternately stacked with separators each of which is sandwiched between one of the positive electrodes 13 and one of the negative electrodes 14. The electrode group 11 includes the positive electrodes 13. Each of the positive electrodes 13 includes a positive electrode current collector 13a, and a positive electrode active material-containing layer 13b supported on each of the both surfaces of the positive electrode current collector 13a. The electrode group 11 includes the negative electrodes 14. Each of the negative electrodes 14 includes a negative electrode current collector 14a, and a negative electrode layer 14b supported on each of the both surfaces of the negative electrode current collector 14a. A film is formed on one surface of the negative electrode active material-containing layer 14b, which is not in contact with the current collector. However, as described above, this film has a much smaller thickness than the negative electrode active material-containing layer 14b. Thus, this film is not illustrated in FIG. 5.

A part of the negative electrode current collector 14a of each of the negative electrodes 14 protrudes from the positive electrodes 13. The protruded part of the negative electrode current collector 14a is electrically connected to a strip-shaped negative electrode terminal 16. The tip of the strip-shaped negative electrode terminal 16 is extended out from the container member 12. Although not shown in the drawings, a part of the positive electrode current collector 13a of the positive electrode 13, which is located at the side opposed to the protruded part of the negative electrode current collector 14a, protrudes from the negative electrode 14. The protruded part of the positive electrode current collector 13a from the positive electrode 13 is electrically connected to a strip-shaped positive electrode terminal 17, although not shown in the drawings. The tip of the strip-shaped positive electrode terminal 17 is located at the opposed side to the negative electrode terminal 16, and extended out from a side of the container member 12.

According to the first embodiment described above, an electrode and a nonaqueous electrolyte battery are provided. The nonaqueous electrolyte battery includes the electrode as a negative electrode, a positive electrode, and a nonaqueous electrolyte. The negative electrode includes a negative electrode active material-containing layer. The negative electrode active material-containing layer includes an Na-containing niobium-titanium composite oxide having an orthorhombic crystal structure. The negative electrode active material-containing layer satisfies an intensity ratio according to an X-ray photoelectron spectroscopy of $I_2/I_1 \geq 1$. The nonaqueous electrolyte battery can suppress a side reaction between the nonaqueous electrolyte and the Na-containing niobium-titanium composite oxide included in the negative electrode active material-containing layer. As a result, the electrode and the nonaqueous electrolyte battery can exhibit excellent life characteristics.

Second Embodiment

According to a second embodiment, a battery pack is provided. The battery pack includes the nonaqueous electrolyte battery according to the first embodiment.

The battery pack according to the embodiment can include one or more nonaqueous electrolyte battery (batteries). The nonaqueous electrolyte batteries, which can be included in the battery pack, can be electrically connected in series, in parallel, or with a combination of series connection and parallel connection. The nonaqueous electrolyte batteries can be electrically connected to constitute a battery module. The battery pack may include plural battery modules.

The battery pack may further include a protective circuit. The protective circuit has a function to control charging and discharging of the nonaqueous electrolyte battery. Alternatively, a circuit included in an equipment where the battery pack serves as a power source (for example, electronic devices, vehicles, and the like) may be used as the protective circuit for the battery pack.

Moreover, the battery pack may further include an external power distribution terminal. The external power distribution terminal is configured to externally output the current from the nonaqueous electrolyte battery, and to input the current to the nonaqueous electrolyte battery. In other words, when the battery pack is used as a power source, the current is externally provided via the external power distribution terminal. Also, when the battery pack is charged, the charging current (including a regenerative energy from motive force of vehicles such as automobiles) is provided to the battery pack via the external power distribution terminal.

Next, a battery pack as an example according to the embodiment will be described with reference to the drawings.

Figure 6:
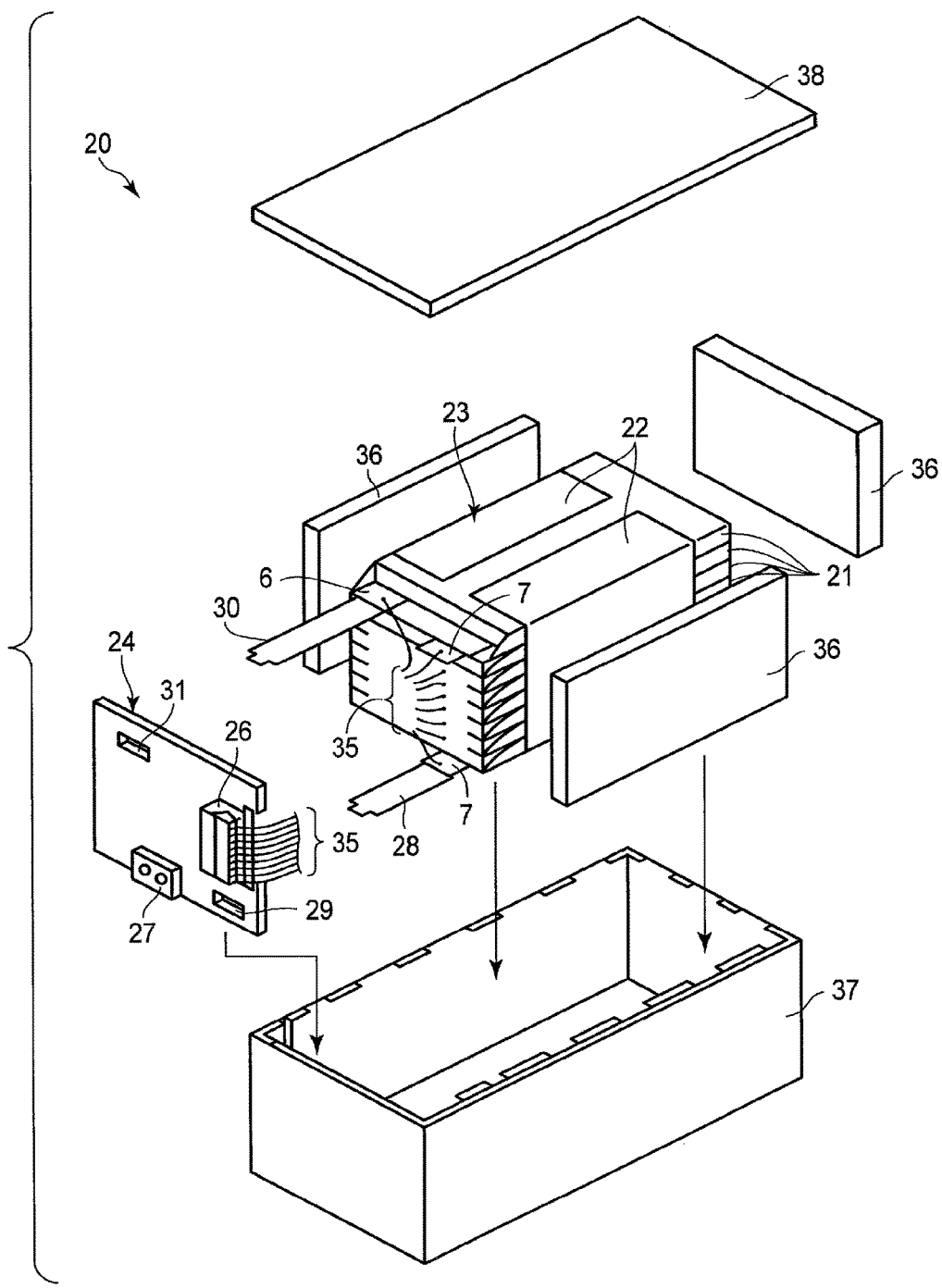
FIG. 6 is an exploded perspective view showing one example of a battery pack according to an embodiment.
Figure 7:
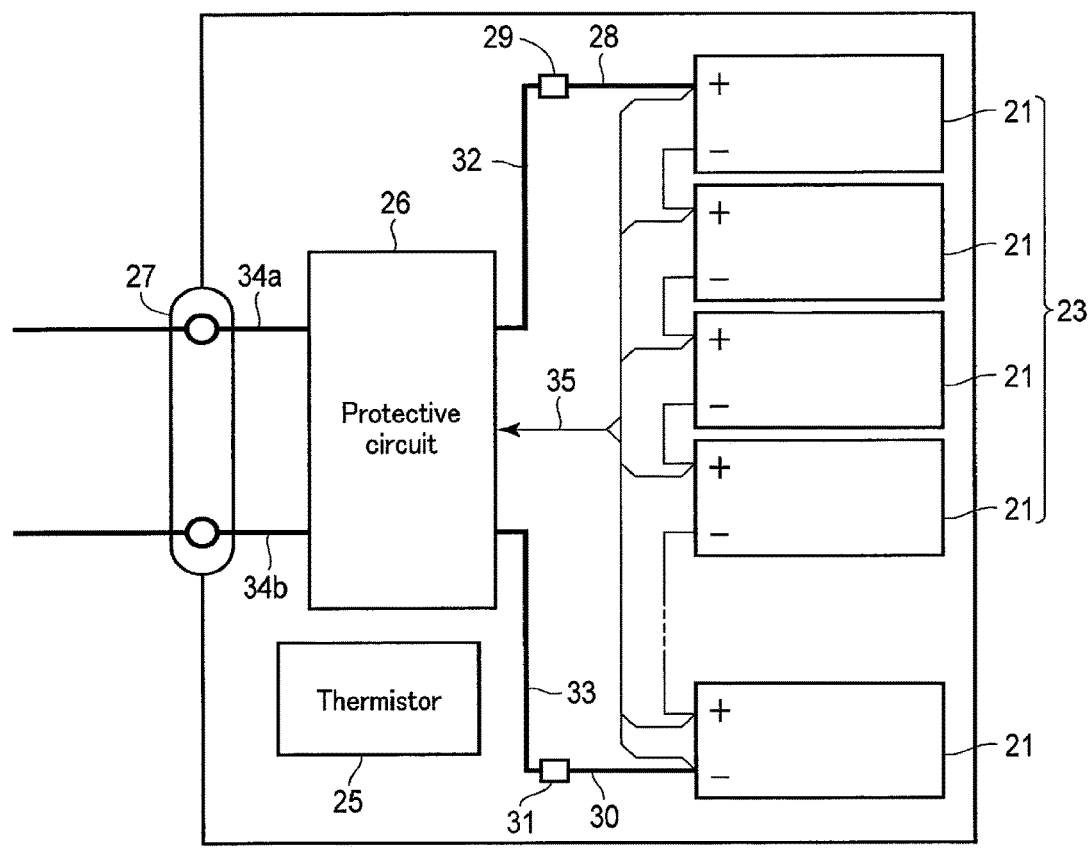
FIG. 7 is a block diagram showing an electric circuit of the battery pack in FIG. 6.

FIG. 6 is an exploded perspective view showing one example of a battery pack according to the embodiment. FIG. 7 is a block diagram showing an electric circuit of the battery pack in FIG. 6.

A battery pack 20 shown in FIGS. 6 and 7 includes a plural single-batteries 21 each having a flat shape and the structure described in FIGS. 2 and 3.

The single-batteries 21 are stacked so that the negative electrode terminals 6 and the positive electrode terminals 7 extended outside are arranged in the same direction, and fastened with an adhesive tape 22 to constitute a battery module 23. The single-batteries 21 are electrically connected to each other in series as shown in FIG. 7.

A printed wiring board 24 is arranged opposed to the side plane where the negative electrode terminals 6 and the positive electrode terminals 7 of the single-batteries 21 are extended. A thermistor 25, a protective circuit 26, and an energizing terminal 27 to an external device (an external power distribution terminal), which are shown in FIG. 7, are mounted on the printed wiring board 24. An electric insulating plate (not shown) is attached to the surface of the printed wiring board 24 facing the battery module 23 to avoid unnecessary connection of the wires of the battery module 23.

A positive electrode-side lead 28 is connected to the positive electrode terminal 7 of the single-battery 21 located at the bottom layer of the battery module 23 and the distal end of the lead 28 is inserted into a positive electrode-side connector 29 of the printed wiring board 24 so as to be electrically connected. An negative electrode-side lead 30 is connected to the negative electrode terminal 6 of the single-battery 21 located at the top layer of the battery module 23 and the distal end of the lead 30 is inserted into an negative electrode-side connector 31 of the printed wiring board 24 so as to be electrically connected. The connectors 29 and 31 are connected to the protective circuit 26 through wires 32 and 33 formed in the printed wiring board 24.

The thermistor 25 detects the temperature of the single-batteries 21 and the detection signal is sent to the protective circuit 26. The protective circuit 26 can shut down a plus-side wirer 34a and a minus-side wirer 34b between the protective circuit 26 and the energizing terminal 27 to an external device under a predetermined condition. The predetermined condition indicates, for example, the case where the temperature detected by the thermistor 25 becomes a predetermined temperature or more. Another example of the predetermined condition indicates the case where the over-charge, over-discharge, or over-current of the single-batteries 21 is detected. The detection of the over-charge and the like is performed on each of the single-batteries 21 or the whole of the battery module 23. When each of the single-batteries 21 is detected, the battery voltage may be detected, or positive electrode or negative electrode potential may be detected. In the case of the latter, a lithium electrode to be used as a reference electrode is inserted into each of the single-batteries 21. In the case of the battery pack 20 of FIGS. 6 and 7, a wirer 35 for voltage detection is connected to each of the single-batteries 21. Detection signals are sent to the protective circuit 26 through the wirers 35.

Protective sheets 36 including rubber or resin are arranged on each of three side planes of the battery module 23 except the side plane from which the positive electrode terminals 7 and the negative electrode terminals 6 are protruded.

The battery module 23 is housed in a housing container 37 together with each of the protective sheets 36 and the printed wiring board 24. The protective sheets 36 are arranged on both internal surfaces in a long side direction and on one internal surface in a short side direction of the housing container 37. The printed wiring board 24 is arranged on an internal surface in the short side direction, other than the internal surface on which one of the protective sheets 36 is provided. The battery module 23 is located in a space surrounded by the protective sheets 36 and the printed wiring board 24. A lid 38 is attached to the upper surface of the housing case 37.

In order to fix the battery module 23, a heat-shrinkable tape may be used in place of the adhesive tape 22. In this case, the battery module is bound by placing the protective sheets on the both sides of the battery module, revolving the heat-shrinkable tape, and thermally shrinking the heat-shrinkable tape.

In FIGS. 6 and 7, the structure in which the single-batteries 21 are connected to each other in series is shown. In order to increase the battery capacity, the single-batteries may be connected to each other in parallel to constitute a battery pack. Alternatively, the assembled battery packs can be connected to each other in series and/or in parallel.

Although the battery pack 20 shown in FIGS. 6 and 7 includes single-batteries 21, a battery pack can include one single-battery 21.

The aspect of the battery pack may be appropriately changed depending on its application. The applications of the battery pack according to the embodiment are preferably those for which excellent cycle characteristics when large-current is taken out are desired. Specific examples of these applications include application as a battery of a digital camera, and application as a battery for a vehicle such as a two- or four-wheeled hybrid electric vehicle, a two- or four-wheeled electric vehicle and a power-assisted bicycle, applications as a stationary battery, and application as a battery for rail way car. Particularly preferably, the battery pack according to the embodiment is used for a battery installed in a vehicle.

In a vehicle having the battery pack according to the embodiment mounted, the battery pack is configured to, for example, recover regenerative energy caused by a motive force of the vehicle.

The battery pack according to the second embodiment includes the nonaqueous electrolyte battery according to the first embodiment. The nonaqueous electrolyte battery can suppress the side reaction between the nonaqueous electrolyte and an Na-containing niobium-titanium composite oxide included in the negative electrode active material-containing layer. Thus, the battery pack according to the second embodiment can exhibit excellent life characteristics.

Third Embodiment

According to a third embodiment, a vehicle is provided. The battery pack according to the second embodiment is installed on this vehicle.

In the vehicle according to the third embodiment, the battery pack is configured, for example, to recover a regenerative energy from a motive force of the vehicle.

Examples of the vehicle according to the third embodiment include two to four-wheeled hybrid electric automobiles, two to four-wheeled electric automobiles, electric assist bicycles, and rail way cars (for example, an electric train).

In the vehicle according to the third embodiment, the installing position of the battery pack is not particularly limited. For example, if the battery pack is installed in an automobile, the battery pack may be installed in the engine compartment of the vehicle, in rear parts of the vehicle, or under seats.

An example of the vehicle according to the third embodiment is described below, with reference to the drawings.

Figure 8:
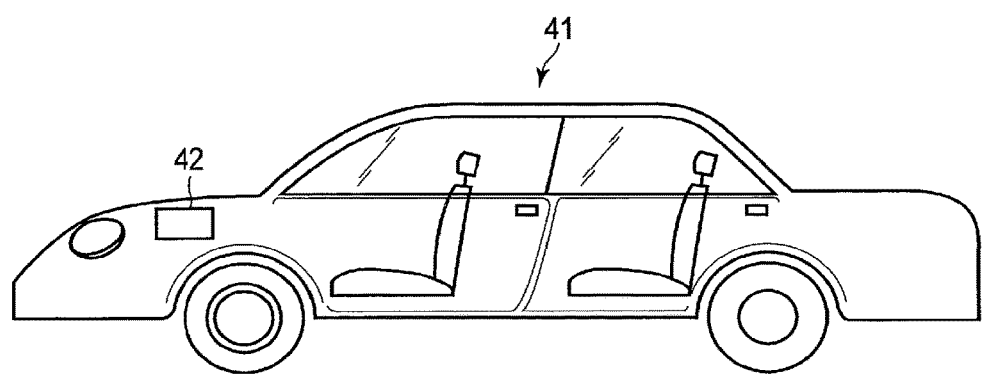
FIG. 8 is a schematic sectional view showing one example of a vehicle according to an embodiment.

FIG. 8 is a schematic sectional view showing one example of a vehicle according to the third embodiment.

A vehicle 41, shown in FIG. 8 is an automobile. The automobile 41 includes a battery pack 42 in an engine compartment located on the front section of the vehicle.

Next, a structure of another example of the vehicle according to the third embodiment is explained with reference to FIG. 9.

FIG. 9 shows a structure of another example of the vehicle according to the third embodiment. A vehicle 300, shown in FIG. 9, is an electric automobile.

The vehicle 300 shown in FIG. 9 includes a vehicle power source 301, a vehicle electric control unit (ECU) 380, which is a master controller of the vehicle power source 301, an external terminal (an external power connection terminal) 370, an inverter 340, and a drive motor 345.

The vehicle 300 includes the vehicle power source 301, for example, in an engine compartment, in the rear section of the automobile body, or under a seat. In FIG. 9, the position of the nonaqueous electrolyte battery installed in the vehicle 300 is schematically shown.

The vehicle power source 301 includes plural (for example, three) battery packs 312a, 312b and 312c, a battery management unit (BMU) 311, and a communication bus 310.

The three battery packs 312a, 312b and 312c are electrically connected to each other in series. The battery pack 312a includes a battery module 314a and a battery module monitoring unit (VTM: voltage temperature monitoring) 313a. The battery pack 312b includes a battery module 314b, and a battery module monitoring unit 313b. The battery pack 312c includes a battery module 314c, and a battery module monitoring unit 313c. The battery packs 312a, 312b and 312c can each be independently removed, and may be exchanged by a different battery pack.

Each of the battery modules 314a to 314c includes plural nonaqueous electrolyte battery connected to each other in series. Each of the plural nonaqueous electrolyte battery is the nonaqueous electrolyte battery according to the first embodiment. The battery modules 314a to 314c each perform charging and discharging through a positive electrode terminal 316 and a negative electrode terminal 317. That is, the battery packs 312a, 312b and 312c are the battery packs each according to the second embodiment.

In order to collect information concerning security of the vehicle power source 301, the battery management unit 311 performs communication with the battery module monitoring units 313a to 313c and collects information such as voltages or temperatures of the nonaqueous electrolyte batteries included in the battery modules 314a to 314c included in the vehicle power source 301.

The communication bus 310 is connected between the battery management unit 311 and the battery module monitoring units 313a to 313c. The communication bus 310 is configured so that multiple nodes (i.e., the battery management unit and one or more battery module monitoring units) share a set of communication lines. The communication bus 310 is, for example, a communication bus configured based on CAN (Control Area Network) standard.

The battery module monitoring units 313a to 313c measure a voltage and a temperature of each nonaqueous electrolyte battery in the battery modules 314a to 314c based on a command communicated from the battery management unit 311. It is possible, however, to measure the temperatures only at several points per battery module and the temperatures of all of the nonaqueous electrolyte batteries need not be measured.

The vehicle power source 301 may also have an electromagnetic contactor (for example, a switch unit 333 shown in FIG. 9) for switching connection between the positive electrode terminal 316 and the negative electrode terminal 317. The switch unit 333 includes a precharge switch (not shown), which is turned on when the battery modules 314a to 314c are charged, and a main switch (not shown), which is turned on when battery output is supplied to a load. The precharge switch and the main switch include a relay circuit (not shown), which is turned on or off based on a signal supplied to a coil located near the switch elements.

The inverter 340 converts an inputted direct-current voltage to a three-phase alternate-current (AC) high voltage for driving a motor. The inverter 340 controls an output voltage based on control signals from the battery management unit 311 or the vehicle ECU 380, which controls the whole operation of the vehicle. Three-phase output terminal(s) of the inverter 340 is connected to each three-phase input terminal of the drive motor 345.

The drive motor 345 is rotated by electric power supplied from the inverter 340. The rotation is transferred to an axle and driving wheels W, for example, through a differential gear unit.

The vehicle 300 also includes a regenerative brake mechanism, which is not shown though. The regenerative brake mechanism rotates the drive motor 345 when the vehicle 300 is braked, and converts kinetic energy to regenerative energy, which is electric energy. The regenerative energy, recovered in the regenerative brake mechanism, is inputted into the inverter 340 and converted to direct current. The direct current is inputted into the vehicle power source 301.

One terminal of a connecting line L1 is connected through a current detector (not shown) in the battery management unit 311 to the negative electrode terminal 317 of the vehicle power source 301. The other terminal of the connecting line L1 is connected to a negative electrode input terminal of the inverter 340.

One terminal of a connecting line L2 is connected through the switch unit 333 to the positive electrode terminal 316 of the vehicle power source 301. The other terminal of the connecting line L2 is connected to a positive electrode input terminal of the inverter 340.

The external terminal 370 is connected to the battery management unit 311. The external terminal 370 is able to connect, for example, to an external power source.

The vehicle ECU 380 cooperatively controls the battery management unit 311 together with other units in response to inputs operated by a driver or the like, thereby performing the management of the whole vehicle. Data concerning the security of the vehicle power source 301, such as a remaining capacity of the vehicle power source 301, are transferred between the battery management unit 311 and the vehicle ECU 380 through communication lines.

The vehicle according to the third embodiment includes the battery pack according to the second embodiment. Therefore, the vehicle can exhibit excellent life characteristics.

EXAMPLES

Examples will be described below. The embodiments, however, are not limited to those described below.

Example 1

In Example 1, a nonaqueous electrolyte battery of Example 1 was fabricated by the following procedure.

<Manufacture of Negative Electrode Active Material>

According to the following procedure, $Li_{2.0}Na_{1.5}Ti_{5.5}Nb_{0.5}O_{14}$ was synthesized as an orthorhombic Na-containing niobium-titanium composite oxide.

To begin with, as raw materials, titanium oxide $TiO_2$, lithium carbonate $Li_2CO_3$, sodium carbonate $Na_2CO_3$ and niobium (V) hydroxide $Nb(OH)_5$ were provided. These raw materials were mixed such that the mole ratio of Li:Na:Ti:Nb in the mixture becomes 2.0:1.5:5.5:0.5. Prior to the mixing, the raw materials were fully ground.

The mixed raw material was subjected to heat treatment for 10 hours at 1000° C. in an air atmosphere. Thus, product powder was obtained. The obtained product powder was subjected to a wet-type ball milling process in pure water for 5 hours, and then filtered. Thereafter, reheat treatment was conducted. The conditions for the reheat treatment were 600° C. and 3 hours. Thus, a powder of negative electrode active material was obtained.

The obtained negative electrode active material was analyzed by the above-described ICP, SEM-EDX, and XRD. As a result, it was found that the obtained negative electrode active material is the powder of the orthorhombic Na-containing niobium-titanium composite oxide having the composition represented by the formula of $Li_{2.0}Na_{1.5}Ti_{5.5}Nb_{0.5}O_{14}$.

<Fabrication of Negative Electrode Intermediate Member>

The active material prepared as described above, acetylene black, and polyvinylidene fluoride (PVdF) were dispersed in N-methylpyrrolidone (NMP) at a mixture ratio of 90% by mass:5% by mass:5% by mass, and were mixed, and were mixed to obtain a mixture. This mixture was further stirred by using a planetary centrifugal mixer to prepare a slurry. This slurry was coated on both surfaces of a current collector formed of an aluminum foil having a thickness of 15 μm, and the coated film was dried. Next, the dried coated film was pressed to fabricate a negative electrode intermediate member, which includes the current collector, and the negative electrode active material-containing layer which is formed on the current collector and has an electrode density (excluding the current collector) of 2.3 g/cm³.

Note that, when the slurry was coated, a part of the current collector was left as a slurry non-coated part. This part was configured as a negative electrode tab. A negative electrode terminal was ultrasonic-bonded to the negative electrode tab.

<Fabrication of Positive Electrode>

By the following procedure, $LiMn_2O_4$ was synthesized as spinel-type lithium manganate.

To begin with, as raw materials, lithium carbonate $Li_2CO_3$ and manganese carbonate $MnCO_3$ were provided. These raw materials were mixed such that the mole ratio of Li:Mn in the mixture becomes 1.0:2.0. Prior to the mixing, the raw materials were fully ground.

The mixed raw material was subjected to heat treatment for 10 hours at 700° C. in an air atmosphere. Thus, a product powder was obtained.

The obtained product powder was analyzed by the above-described ICP, SEM-EDX, and XRD. As a result, it was found that the obtained positive electrode active material is the powder of the spinel-type lithium manganate having the composition represented by the formula of $LiMn_2O_4$.

The active material prepared as described above, acetylene black, and polyvinylidene fluoride (PVdF) were dispersed in N-methylpyrrolidone (NMP) at a mixture ratio of 90% by mass:5% by mass:5% by mass, and were mixed to obtain a mixture. This mixture was further stirred by using a planetary centrifugal mixer, and a slurry was prepared. This slurry was coated on both surfaces of a current collector formed of an aluminum foil having a thickness of 15 μm, and the coated film was dried. Next, the dried coated film was pressed, and a positive electrode was fabricated, which includes the current collector, and the positive electrode active material-containing layer which is formed on the current collector and has an electrode density (excluding the current collector) of 2.9 g/cm$^3$.

Note that, when the slurry was coated, a part of the current collector was left as a slurry non-coated part.

This part was configured as a positive electrode tab. A positive electrode terminal was ultrasonic-bonded to the positive electrode tab.

<Fabrication of Electrode Group>

Two separators, each of which is formed of a polyethylene porous film having a thickness of 25 μm, were provided. Then, the previously fabricated positive electrode, one separator, the previously fabricated negative electrode intermediate member, and the other separator were stacked in this order to obtain a stack. This stack was spirally wound to obtain a winding body. Next, a winding core was removed from the winding body, and the winding body was subjected to heat press at 90° C. Thus, a flat-shaped electrode group having a width of 30 mm and a thickness of 3.0 mm was fabricated.

<Accommodation of Electrode Group into Container Member>

The obtained electrode group was wrapped with a laminate film. As the laminate film, use was made of a laminate film with an entire thickness of 0.1 mm, which is configured such that polypropylene layers are formed on both surfaces of aluminum foil having a thickness of 40 μm. At this time, at one edge part of the laminate film, a part of the negative electrode terminal was sandwiched between two parts of the polypropylene layers which face to each other. In addition, the other part of the negative electrode terminal was located outside of the laminate film. Similarly, at one edge part of the laminate film, a part of the positive electrode terminal was sandwiched between two parts of the polypropylene layers which face to each other. In addition, the other part of the positive electrode terminal was located outside of the laminate film.

Next, the edge part, in which the part portion of the negative electrode terminal was sandwiched, was heat-sealed. Similarly, the edge part, in which the part of the positive electrode terminal was sandwiched, was heat-sealed. Thus, the electrode group was accommodated in a container member formed of the laminate film.

Subsequently, the electrode group was subjected to vacuum drying for 24 hours at 80° C. in the container member.

<Preparation of Liquid Nonaqueous Electrolyte>

As a nonaqueous solvent, ethylene carbonate (EC), propylene carbonate (PC) and ethyl methyl carbonate (EMC) were provided. These were mixed such that the volume ratio of EC:PC:EMC becomes 1:1:4 to prepare a mixed solvent.

Into this mixed solvent, lithium hexafluorophosphate ($LiPF_6$) was dissolved at a concentration of 1.2 M. Thus, a liquid nonaqueous electrolyte was prepared.

<Fabrication of Battery Unit>

A battery unit was fabricated in a dry argon environment, as will be described below with reference to FIG. 10A to FIG. 10F.

FIG. 10A to FIG. 10F are schematic views illustrating parts of the fabrication procedure of the nonaqueous electrolyte battery of Example 1.

To begin with, as illustrated in FIG. 10A, a previously prepared liquid nonaqueous electrolyte 8 was injected in the container member 2 of the laminate film, which accommodates the electrode group 1. Then, as illustrated in FIG. 10B, an edge part 2a of the container member 2 was heat-sealed. Thus, the electrode group 1 and liquid nonaqueous electrolyte 8 were completely sealed in the container member 2. At this time, as illustrated in FIG. 10B, a distance was provided between the heat seal portion 2a and the part in which the electrode group 1 is accommodated.

Thus, a battery unit 10' of Example 1 was fabricated.

<Aging Process>

The fabricated battery unit 10' of Example 1 was subjected to a first aging process and then to a second aging process, according to the following procedure.

To begin with, the voltage of the battery unit 10' was adjusted to 2.5 V according to the above-described procedure. This battery unit was subjected to the first aging process. The first aging process was conducted for 10 hours in a temperature environment of 60° C. Then, as illustrated in FIG. 10C, the container member 2 was opened by being cut along a cutting line 2A shown in FIG. 10B. Thus, gas in the container member 2 was released.

Figure 10D:
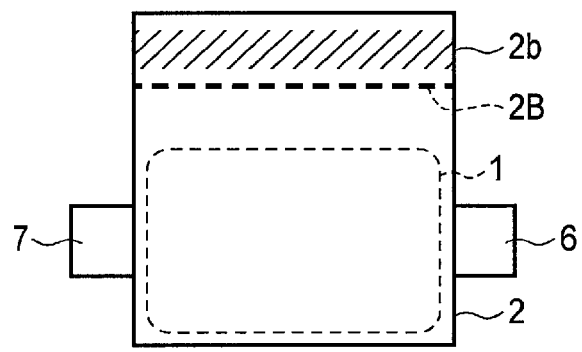
FIG. 10D is a schematic view illustrating a part of the fabrication procedure of the nonaqueous electrolyte battery of Example 1.

Next, as illustrated in FIG. 10D, an edge part 2b of the container member 2 was heat-sealed. Thus, the electrode group 1 and liquid nonaqueous electrolyte 8 were completely sealed in the container member 2.

Figure 10E:
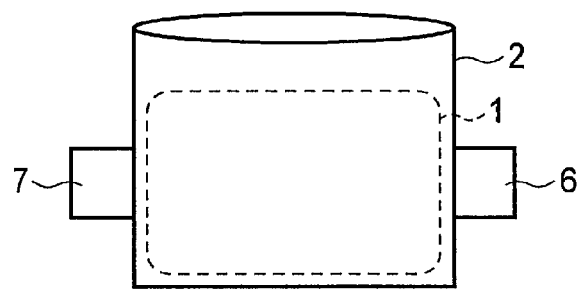
FIG. 10E is a schematic view illustrating a part of the fabrication procedure of the nonaqueous electrolyte battery of Example 1.

Subsequently, the voltage of the battery unit 10' was adjusted to 2.8 V according to the above-described procedure. This battery unit 10' was subjected to the second aging process. The second aging process was conducted for 10 hours in a temperature environment of 80° C. Then, as illustrated in FIG. 10E, the container member 2 was opened by being cut along a cutting line 2B shown in FIG. 10D. Thus, gas in the container member 2 was released.

Figure 10F:
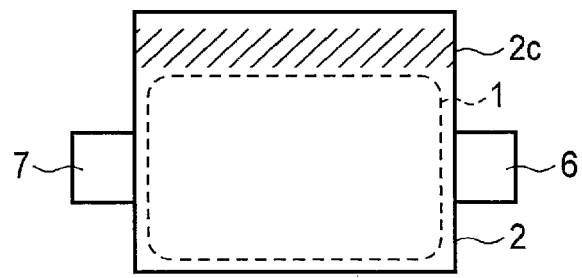
FIG. 10F is a schematic view illustrating a part of the fabrication procedure of the nonaqueous electrolyte battery of Example 1.

Next, as illustrated in FIG. 10F, an edge part 2c of the container member 2 was heat-sealed. Thus, the electrode group 1 and liquid nonaqueous electrolyte 8 were completely sealed in the container member 2.

Thus, a nonaqueous electrolyte battery 10 of Example 1 was obtained, which has the same structure as the nonaqueous electrolyte battery 10 according to the above-described example illustrated in FIGS. 2 and 3, and has, specifically, a width of 35 mm, a thickness of 3.2 mm and a height of 65 mm.

<Charge-and-Discharge Cycle Test of Test Cell>

The nonaqueous electrolyte battery 10 of Example 1 was subjected to a charge-and-discharge cycle test under a high-temperature, according to the following procedure.

The test temperature environment was set at 60° C. In the charging, the battery 10 was charged at a constant current value of 0.2 C until the voltage reaches 3.0 V, and was then charged at a constant voltage of 3.0 V. The charging was stopped when the current value reached ½₀ C. The discharging was performed at a constant current value of 0.2 C. The discharging was stopped when the voltage of the battery 10 reached 1.8 V. A halt of 1 minute under the same temperature environment was provided between the charging and discharging. One cycle was constituted by the charging, discharging and halt. The number of cycles conducted in this test was set to be 500 cycles. The discharge capacity of the 500th cycle of the nonaqueous electrolyte battery was divided by the discharge capacity of the first cycle. Thereby, the capacity retention ratio after 500 cycles under high temperature was evaluated. This capacity retention ratio serves as an index of the cycle characteristics of the electrode.

<X-ray Photoelectron Spectroscopy (XPS) Measurement>

Following the above cycle test, XPS measurement was conducted according to the following procedure. As the apparatus, the PHI Quantera SXM manufactured by ULVAC-PHI, Inc was used. As an excitation X-ray source, Al-Kα ray (1486.6 eV) split by a single crystal is used, and the photoelectron detection angle is set at 45°. By this measurement, the intensity $I_1$ of the peak $P_1$ appearing in the range of 289 eV to 292 eV on the negative electrode surface, and the intensity $I_2$ of the peak $P_2$ appearing in the range of 283 eV to 285 eV were measured.

Examples 2 to 22

In Examples 2 to 22, a nonaqueous electrolyte battery of each of Examples 2 to 22 was fabricated according to the same procedure as in Example 1, except that the conditions of the first aging process and/or second aging process were changed to the conditions shown in Table 1 below.

Example 23

In Example 23, a nonaqueous electrolyte battery of Example 23 was fabricated according to the same procedure as in Example 1, except that an orthorhombic Na-containing niobium-titanium composite oxide having a composition represented by a formula of $Li_2Na_{1.75}Ti_{5.75}Nb_{0.25}O_{14}$ was used as the negative electrode active material.

The orthorhombic Na-containing niobium-titanium composite oxide having the composition represented by the formula of $Li_2Na_{1.75}Ti_{5.75}Nb_{0.25}O_{14}$ was synthesized according to the following procedure.

To begin with, as raw materials, titanium oxide $TiO_2$, lithium carbonate $Li_2CO_3$, sodium carbonate $Na_2CO_3$ and niobium (V) hydroxide $Nb(OH)_5$ were provided. These raw materials were mixed such that the mole ratio of Li:Na:Ti:Nb of the mixture becomes 2.0:1.75:5.75:0.25. Prior to the mixing, the raw materials were fully ground.

The mixed raw material was subjected to heat treatment for 10 hours at 1000° C. in an air atmosphere. Thus, a product powder was obtained. The obtained product powder was subjected to a wet-type ball milling process in pure water for 5 hours, and then filtered. Thereafter, reheat treatment was conducted. The conditions for the reheat treatment were 600° C. and 3 hours. Thus, a powder of negative electrode active material was obtained.

The obtained negative electrode active material was analyzed by the above-described ICP, SEM-EDX, and XRD. As a result, it was found that the obtained negative electrode active material is the powder of the orthorhombic Na-containing niobium-titanium composite oxide having the composition represented by the formula of $Li_{2.0}Na_{1.75}Ti_{5.75}Nb_{0.25}O_{14}$.

By using the active material obtained as described above, a negative electrode intermediate member was fabricated according to the following procedure.

The active material prepared as described above, acetylene black, and polyvinylidene fluoride (PVdF) were dispersed in N-methylpyrrolidone (NMP) at a mixture ratio of 90% by mass:5% by mass:5% by mass, and were mixed to obtain a mixture. This mixture was further stirred by using a planetary centrifugal mixer to prepare a slurry. This slurry was coated on both surfaces of a current collector formed of an aluminum foil having a thickness of 15 μm, and the coated film was dried. Next, the dried coated film was pressed to fabricate a negative electrode intermediate member, which includes the current collector, and the negative electrode active material-containing layer which is formed on the current collector and has an electrode density (excluding the current collector) of 2.3 g/cm³.

Note that, when the slurry was coated, a part of the current collector was left as a slurry non-coated part. This part was configured as a negative electrode tab. A negative electrode terminal was ultrasonic-bonded to the negative electrode tab.

Examples 24 to 44

In Examples 24 to 44, a nonaqueous electrolyte battery of each of Examples 24 to 44 was fabricated according to the same procedure as in Example 23, except that the conditions of the first aging process and/or second aging process were changed to the conditions shown in Table 1 or Table 2 below.

Example 45

In Example 45, a nonaqueous electrolyte battery of Example 45 was fabricated according to the same procedure as in Example 1, except that an orthorhombic Na-containing niobium-titanium composite oxide having a composition represented by a formula of $Li_2Na_{1.8}Ti_{5.8}Nb_{0.2}O_{14}$ was used as the negative electrode active material.

The orthorhombic Na-containing niobium-titanium composite oxide having the composition represented by the formula of $Li_{2.4}Na_{1.8}Ti_{5.8}Nb_{0.2}O_{14}$, was synthesized according to the following procedure.

To begin with, as raw materials, titanium oxide $TiO_2$, lithium carbonate $Li_2CO_3$, sodium carbonate $Na_2CO_3$ and niobium (V) hydroxide $Nb(OH)_5$ were provided. These raw materials were mixed such that the mole ratio of Li:Na:Ti:Nb of the mixture becomes 2.0:1.8:5.8:0.2. Prior the mixing, the raw materials were fully ground.

The mixed raw material was subjected to heat treatment for 10 hours at 1000° C. in an air atmosphere. Thus, a product powder was obtained. The obtained product powder was subjected to a wet-type ball milling process in pure water for 5 hours in pure water, and then filtered. Thereafter, reheat treatment was conducted. The conditions for the reheat treatment were 600° C. and 3 hours. Thus, a powder of negative electrode active material was obtained.

The obtained negative electrode active material was analyzed by the above-described ICP, SEM-EDX, and XRD. As a result, it was found that the obtained negative electrode active material is the powder of the orthorhombic Na-containing niobium-titanium composite oxide having the composition represented by the formula of $Li_{2.0}Na_{1.8}Ti_{5.8}Nb_{0.2}O_{14}$.

By using the active material obtained as described above, a negative electrode intermediate member was fabricated according to the following procedure.

The active material prepared as described above, acetylene black, and polyvinylidene fluoride (PVdF) were dispersed in N-methylpyrrolidone (NMP) at a mixture ratio of 90% by mass:5% by mass:5% by mass, and were mixed to obtain a mixture. This mixture was further stirred by using a planetary centrifugal mixer to prepare a slurry. This slurry was coated on both surfaces of a current collector formed of an aluminum foil having a thickness of 15 μm, and the coated film was dried. Next, the dried film was pressed to fabricate a negative electrode intermediate member was fabricated, which includes the current collector, and the negative electrode active material-containing layer which is formed on the current collector and has an electrode density (excluding the current collector) of 2.3 g/cm$^3$.

Note that, when the slurry was coated, a part of the current collector was left as a slurry non-coated part. This part was configured as a negative electrode tab. A negative electrode terminal was ultrasonic-bonded to the negative electrode tab.

Example 46

In Example 46, a nonaqueous electrolyte battery of Example 46 was fabricated according to the same procedure as in Example 1, except that an orthorhombic Na-containing niobium-titanium composite oxide having a composition represented by a formula of $Li_2Na_{1.4}K_{0.1}Ti_{5.5}Nb_{0.5}O_{14}$ was used as the negative electrode active material.

The orthorhombic Na-containing niobium-titanium composite oxide having has the composition represented by the formula of, $Li_2Na_{1.4}K_{0.1}Ti_{5.5}Nb_{0.5}O_{14}$ was synthesized according to the following procedure.

To begin with, as raw materials, titanium oxide $TiO_2$, lithium carbonate $Li_2CO_3$, sodium carbonate $Na_2CO_3$, potassium carbonate $K_2CO_3$, and niobium (V) hydroxide $Nb(OH)_5$ were provided. These raw materials were mixed such that the mole ratio of Li:Na:K:Ti:Nb of the mixture becomes 2.0:1.4:0.1:5.5:0.5. Prior to the mixing, the raw materials were fully ground.

The mixed raw material was subjected to heat treatment for 10 hours at 1000° C. in an air atmosphere. Thus, a product powder was obtained. The obtained product powder was subjected to a wet-type ball milling process in pure water for 5 hours in pure water, and then filtered. Thereafter, reheat treatment was conducted. The conditions for the reheat treatment were 600° C. and 3 hours. Thus, a powder of negative electrode active material was obtained.

The obtained negative electrode active material was analyzed by the above-described ICP, SEM-EDX, and XRD. As a result, it was found that the obtained negative electrode active material is the powder of the orthorhombic Na-containing niobium-titanium composite oxide having the composition represented by the formula of $Li_{2.0}Na_{1.4}K_{0.1}Ti_{5.5}Nb_{0.5}O_{14}$.

By using the active material obtained as described above, a negative electrode intermediate member was fabricated according to the following procedure.

90% by mass of the active material prepared as described above, 5% by mass of acetylene black, and 5% by mass of polyvinylidene fluoride (PVdF) were dispersed in N-methylpyrrolidone (NMP), and were mixed to obtain a mixture. This mixture was further stirred by using a planetary centrifugal mixer to prepare a slurry. This slurry was coated on both surfaces of a current collector formed of an aluminum foil having a thickness of 15 μm, and the coated film was dried. Next, the dried coated film was pressed to fabricate a negative electrode intermediate member, which includes the current collector, and the negative electrode active material-containing layer which is formed on the current collector and has an electrode density (excluding the current collector) of 2.3 g/cm$^3$.

Note that, when the slurry was coated, a part of the current collector was left as a slurry non-coated part. This part was configured as a negative electrode tab. A negative electrode terminal was ultrasonic-bonded to the negative electrode tab.

Example 47

In Example 47, a nonaqueous electrolyte battery of Example 47 was fabricated according to the same procedure as in Example 1, except that an orthorhombic Na-containing niobium-titanium composite oxide having a composition represented by a formula of $Li_2Na_{1.6}Ti_{5.5}Nb_{0.4}Zr_{0.1}O_{14}$ was used as the negative electrode active material.

The orthorhombic Na-containing niobium-titanium composite oxide having the composition represented by the formula of $Li_2Na_{1.6}Ti_{5.5}Nb_{0.4}Zr_{0.1}O_{14}$ was synthesized according to the following procedure.

To begin with, as raw materials, titanium oxide $TiO_2$, lithium carbonate $Li_2CO_3$, sodium carbonate $Na_2CO_3$, niobium (V) hydroxide $Nb(OH)_5$, and zirconium hydroxide $Zr(OH)_4$, were provided. These raw materials were mixed such that the mole ratio of Li:Na:Ti:Nb:Zr of the mixture becomes 2.0:1.6:5.5:0.4:0.1. Prior to the mixing, the raw materials were fully ground.

The mixed raw material was subjected to heat treatment for 10 hours at 1000° C. in an air atmosphere. Thus, a powder of a product was obtained. The obtained product powder was subjected to a wet-type ball milling process in pure water for 5 hours, and then filtered. Thereafter, reheat treatment was conducted. The conditions for the reheat treatment were 600° C. and 3 hours. Thus, a powder of negative electrode active material was obtained.

The obtained negative electrode active material was analyzed by the above-described ICP, SEM-EDX, and XRD. As a result, it was found that the obtained negative electrode active material is the powder of the orthorhombic Na-containing niobium-titanium composite oxide having the composition represented by the formula of $Li_2Na_{1.6}Ti_{5.5}Nb_{0.4}Zr_{0.1}O_{14}$.

By using the active material obtained as described above, a negative electrode intermediate member was fabricated according to the following procedure.

The active material prepared as described above, acetylene black, and polyvinylidene fluoride (PVdF) were dispersed in N-methylpyrrolidone (NMP) at a mixture ratio of 90% by mass:5% by mass:5% by mass, and were mixed to obtain a mixture. This mixture was further stirred by using a planetary centrifugal mixer to prepare a slurry. This slurry was coated on both surfaces of a current collector formed of an aluminum foil having a thickness of 15 μm, and the coated film was dried. Next, the dried coated film was pressed to fabricate a negative electrode intermediate member, which includes the current collector, and the negative electrode active material-containing layer which is formed on the current collector and has an electrode density (excluding the current collector) of 2.3 g/cm$^3$.

Note that, when the slurry was coated, a part of the current collector was left as a slurry non-coated part. This part was configured as a negative electrode tab. A negative electrode terminal was ultrasonic-bonded to the negative electrode tab.

Comparative Example 1

In Comparative Example 1, a nonaqueous electrolyte battery of Comparative Example 1 was fabricated according to the same procedure as in Example 1, except that the liquid nonaqueous electrolyte was changed.

The liquid nonaqueous electrolyte used in Comparative Example 1 was prepared according to the following procedure. To begin with, as a nonaqueous solvent, propylene carbonate (PC) and ethyl methyl carbonate (EMC) were provided. These were mixed such that the volume ratio of PC:EMC becomes 1:2 to prepare a mixed solvent. Into this mixed solvent, lithium hexafluorophosphate ($LiPF_6$) was dissolved at a concentration of 1.2 M. Thus, the liquid nonaqueous electrolyte was prepared.

Comparative Example 2

In Comparative Example 2, a nonaqueous electrolyte battery of Comparative Example 2 was fabricated according to the same procedure as in Example 1, except that the conditions of the first aging and second aging of the battery unit were changed to the conditions shown in Table 2 below.

Comparative Examples 3 to 6

In Comparative Examples 3 to 6, a nonaqueous electrolyte battery of each of Comparative Examples 3 to 6 was fabricated according to the same procedure as in Example 1, except that the aging of the battery unit was conducted only once under the conditions shown in Table 2 below.

The respective nonaqueous electrolyte batteries of Examples 2 to 47 and Comparative Examples 1 to 6 were subjected to tests, like the nonaqueous electrolyte battery of Example 1. The results of the tests are shown in Table 3 and Table 4 below.

TABLE 1

| | Composition of Active Material | First Aging Process | | | Second Aging Process | | |
|---|---|---|---|---|---|---|---|
| | | Temperature/°C. | Duration/h | Voltage/V | Temperature/°C. | Duration/h | Voltage/V |
| Example 1 | $Li_2Na_{1.5}Ti_{5.5}Nb_{0.5}O_{14}$ | 60 | 10 | 2.5 | 80 | 10 | 2.8 |
| Example 2 | $Li_2Na_{1.5}Ti_{5.5}Nb_{0.5}O_{14}$ | 60 | 10 | 1.8 | 80 | 10 | 3.0 |
| Example 3 | $Li_2Na_{1.5}Ti_{5.5}Nb_{0.5}O_{14}$ | 60 | 10 | 1.8 | 80 | 10 | 2.8 |
| Example 4 | $Li_2Na_{1.5}Ti_{5.5}Nb_{0.5}O_{14}$ | 60 | 10 | 2.5 | 80 | 10 | 3.0 |
| Example 5 | $Li_2Na_{1.5}Ti_{5.5}Nb_{0.5}O_{14}$ | 60 | 5 | 2.5 | 80 | 5 | 2.8 |
| Example 6 | $Li_2Na_{1.5}Ti_{5.5}Nb_{0.5}O_{14}$ | 60 | 5 | 2.5 | 80 | 10 | 2.8 |
| Example 7 | $Li_2Na_{1.5}Ti_{5.5}Nb_{0.5}O_{14}$ | 60 | 10 | 2.5 | 80 | 5 | 2.8 |
| Example 8 | $Li_2Na_{1.5}Ti_{5.5}Nb_{0.5}O_{14}$ | 60 | 10 | 2.5 | 80 | 20 | 2.8 |
| Example 9 | $Li_2Na_{1.5}Ti_{5.5}Nb_{0.5}O_{14}$ | 60 | 20 | 2.5 | 80 | 20 | 2.8 |
| Example 10 | $Li_2Na_{1.5}Ti_{5.5}Nb_{0.5}O_{14}$ | 60 | 20 | 2.5 | 80 | 10 | 2.8 |
| Example 11 | $Li_2Na_{1.5}Ti_{5.5}Nb_{0.5}O_{14}$ | 60 | 40 | 2.5 | 80 | 40 | 2.8 |
| Example 12 | $Li_2Na_{1.5}Ti_{5.5}Nb_{0.5}O_{14}$ | 60 | 10 | 2.5 | 120 | 10 | 2.8 |
| Example 13 | $Li_2Na_{1.5}Ti_{5.5}Nb_{0.5}O_{14}$ | 60 | 10 | 1.8 | 120 | 10 | 3.0 |
| Example 14 | $Li_2Na_{1.5}Ti_{5.5}Nb_{0.5}O_{14}$ | 60 | 10 | 1.8 | 120 | 10 | 2.8 |
| Example 15 | $Li_2Na_{1.5}Ti_{5.5}Nb_{0.5}O_{14}$ | 60 | 10 | 2.5 | 120 | 10 | 3.0 |
| Example 16 | $Li_2Na_{1.5}Ti_{5.5}Nb_{0.5}O_{14}$ | 60 | 5 | 2.5 | 120 | 5 | 2.8 |
| Example 17 | $Li_2Na_{1.5}Ti_{5.5}Nb_{0.5}O_{14}$ | 60 | 5 | 2.5 | 120 | 10 | 2.8 |
| Example 18 | $Li_2Na_{1.5}Ti_{5.5}Nb_{0.5}O_{14}$ | 60 | 10 | 2.5 | 120 | 5 | 2.8 |
| Example 19 | $Li_2Na_{1.5}Ti_{5.5}Nb_{0.5}O_{14}$ | 60 | 10 | 2.5 | 120 | 20 | 2.8 |
| Example 20 | $Li_2Na_{1.5}Ti_{5.5}Nb_{0.5}O_{14}$ | 60 | 20 | 2.5 | 120 | 20 | 2.8 |
| Example 21 | $Li_2Na_{1.5}Ti_{5.5}Nb_{0.5}O_{14}$ | 60 | 20 | 2.5 | 120 | 10 | 2.8 |
| Example 22 | $Li_2Na_{1.5}Ti_{5.5}Nb_{0.5}O_{14}$ | 60 | 40 | 2.5 | 120 | 40 | 2.8 |
| Example 23 | $Li_2Na_{1.75}Ti_{5.75}Nb_{0.25}O_{14}$ | 60 | 10 | 2.5 | 80 | 10 | 2.8 |
| Example 24 | $Li_2Na_{1.75}Ti_{5.75}Nb_{0.25}O_{14}$ | 60 | 10 | 1.8 | 80 | 10 | 3.0 |
| Example 25 | $Li_2Na_{1.75}Ti_{5.75}Nb_{0.25}O_{14}$ | 60 | 10 | 1.8 | 80 | 10 | 2.8 |
| Example 26 | $Li_2Na_{1.75}Ti_{5.75}Nb_{0.25}O_{14}$ | 60 | 10 | 2.5 | 80 | 10 | 3.0 |
| Example 27 | $Li_2Na_{1.75}Ti_{5.75}Nb_{0.25}O_{14}$ | 60 | 5 | 2.5 | 80 | 5 | 2.8 |
| Example 28 | $Li_2Na_{1.75}Ti_{5.75}Nb_{0.25}O_{14}$ | 60 | 5 | 2.5 | 80 | 10 | 2.8 |
| Example 29 | $Li_2Na_{1.75}Ti_{5.75}Nb_{0.25}O_{14}$ | 60 | 10 | 2.5 | 80 | 5 | 2.8 |
| Example 30 | $Li_2Na_{1.75}Ti_{5.75}Nb_{0.25}O_{14}$ | 60 | 10 | 2.5 | 80 | 20 | 2.8 |

TABLE 2

| | Composition of Active Material | First Aging Process | | | Second Aging Process | | |
|---|---|---|---|---|---|---|---|
| | | Temperature/°C | Duration/h | Voltage/V | Temperature/°C | Duration/h | Voltage/V |
| Example 31 | $Li_2Na_{1.75}Ti_{5.75}Nb_{0.25}O_{14}$ | 60 | 20 | 2.5 | 80 | 20 | 2.8 |
| Example 32 | $Li_2Na_{1.75}Ti_{5.75}Nb_{0.25}O_{14}$ | 60 | 20 | 2.5 | 80 | 10 | 2.8 |
| Example 33 | $Li_2Na_{1.75}Ti_{5.75}Nb_{0.25}O_{14}$ | 60 | 40 | 2.5 | 80 | 40 | 2.8 |
| Example 34 | $Li_2Na_{1.75}Ti_{5.75}Nb_{0.25}O_{14}$ | 60 | 10 | 2.5 | 120 | 10 | 2.8 |
| Example 35 | $Li_2Na_{1.75}Ti_{5.75}Nb_{0.25}O_{14}$ | 60 | 10 | 1.8 | 120 | 10 | 3.0 |
| Example 36 | $Li_2Na_{1.75}Ti_{5.75}Nb_{0.25}O_{14}$ | 60 | 10 | 1.8 | 120 | 10 | 2.8 |
| Example 37 | $Li_2Na_{1.75}Ti_{5.75}Nb_{0.25}O_{14}$ | 60 | 10 | 2.5 | 120 | 10 | 3.0 |
| Example 38 | $Li_2Na_{1.75}Ti_{5.75}Nb_{0.25}O_{14}$ | 60 | 5 | 2.5 | 120 | 5 | 2.8 |
| Example 39 | $Li_2Na_{1.75}Ti_{5.75}Nb_{0.25}O_{14}$ | 60 | 5 | 2.5 | 120 | 10 | 2.8 |
| Example 40 | $Li_2Na_{1.75}Ti_{5.75}Nb_{0.25}O_{14}$ | 60 | 10 | 2.5 | 120 | 5 | 2.8 |
| Example 41 | $Li_2Na_{1.75}Ti_{5.75}Nb_{0.25}O_{14}$ | 60 | 10 | 2.5 | 120 | 20 | 2.8 |
| Example 42 | $Li_2Na_{1.75}Ti_{5.75}Nb_{0.25}O_{14}$ | 60 | 20 | 2.5 | 120 | 20 | 2.8 |
| Example 43 | $Li_2Na_{1.75}Ti_{5.75}Nb_{0.25}O_{14}$ | 60 | 20 | 2.5 | 120 | 10 | 2.8 |
| Example 44 | $Li_2Na_{1.75}Ti_{5.75}Nb_{0.25}O_{14}$ | 60 | 40 | 2.5 | 120 | 40 | 2.8 |
| Example 45 | $Li_2Na_{1.8}Ti_{5.8}Nb_{0.2}O_{14}$ | 60 | 10 | 2.5 | 80 | 10 | 2.8 |
| Example 46 | $Li_2Na_{1.4}K_{0.1}Ti_{5.5}Nb_{0.5}O_{14}$ | 60 | 10 | 2.5 | 80 | 10 | 2.8 |
| Example 47 | $Li_2Na_{1.6}Ti_{5.5}Nb_{0.4}Zr_{0.1}O_{14}$ | 60 | 10 | 2.5 | 80 | 10 | 2.8 |
| Comparative Example 1 | $Li_2Na_{1.5}Ti_{5.5}Nb_{0.5}O_{14}$ | 60 | 10 | 2.8 | 80 | 10 | 2.5 |
| Comparative Example 2 | $Li_2Na_{1.5}Ti_{5.5}Nb_{0.5}O_{14}$ | 80 | 10 | 2.8 | 60 | 10 | 2.5 |
| Comparative Example 3 | $Li_2Na_{1.5}Ti_{5.5}Nb_{0.5}O_{14}$ | 60 | 20 | 2.5 | (aging was conducted only once) | | |
| Comparative Example 4 | $Li_2Na_{1.5}Ti_{5.5}Nb_{0.5}O_{14}$ | 80 | 20 | 2.5 | (aging was conducted only once) | | |
| Comparative Example 5 | $Li_2Na_{1.5}Ti_{5.5}Nb_{0.5}O_{14}$ | 60 | 20 | 2.8 | (aging was conducted only once) | | |
| Comparative Example 6 | $Li_2Na_{1.5}Ti_{5.5}Nb_{0.5}O_{14}$ | 80 | 20 | 2.8 | (aging was conducted only once) | | |

TABLE 3

| | Intensity Ratio $I_2/I_1$ | Capacity Retention Ratio after Cycles (%) |
|---|---|---|
| Example 1 | 1.67 | 95 |
| Example 2 | 1.6 | 92 |
| Example 3 | 1.57 | 93 |
| Example 4 | 1.55 | 91 |
| Example 5 | 1.6 | 92 |
| Example 6 | 1.61 | 92 |
| Example 7 | 1.62 | 91 |
| Example 8 | 1.6 | 91 |
| Example 9 | 1.59 | 91 |
| Example 10 | 1.59 | 92 |
| Example 11 | 1.58 | 90 |
| Example 12 | 1.6 | 90 |
| Example 13 | 1.56 | 89 |
| Example 14 | 1.58 | 88 |
| Example 15 | 1.55 | 89 |
| Example 16 | 1.55 | 88 |
| Example 17 | 1.55 | 87 |
| Example 18 | 1.58 | 89 |
| Example 19 | 1.55 | 87 |
| Example 20 | 1.52 | 88 |
| Example 21 | 1.5 | 86 |
| Example 22 | 1.47 | 85 |
| Example 23 | 1.6 | 92 |
| Example 24 | 1.55 | 90 |
| Example 25 | 1.58 | 88 |
| Example 26 | 1.57 | 87 |
| Example 27 | 1.58 | 87 |
| Example 28 | 1.57 | 88 |
| Example 29 | 1.55 | 85 |
| Example 30 | 1.48 | 84 |
| Example 31 | 1.44 | 85 |
| Example 32 | 1.32 | 84 |
| Example 33 | 1.31 | 83 |
| Example 34 | 1.27 | 81 |
| Example 35 | 1.3 | 83 |
| Example 36 | 1.28 | 84 |
| Example 37 | 1.21 | 82 |
| Example 38 | 1.25 | 83 |
| Example 39 | 1.26 | 84 |
| Example 40 | 1.2 | 82 |
| Example 41 | 1.11 | 81 |
| Example 42 | 1 | 80 |
| Example 43 | 1.02 | 81 |
| Example 44 | 1.05 | 80 |
| Example 45 | 1.11 | 85 |
| Example 46 | 1.62 | 93 |
| Example 47 | 1.60 | 91 |

TABLE 4

| | Intensity Ratio $I'_2/I'_1$ | Capacity Retention Ratio after Cycles (%) |
|---|---|---|
| Comparative Example 1 | 0.95 | 78 |
| Comparative Example 2 | 0.9 | 75 |
| Comparative Example 3 | 0.87 | 71 |
| Comparative Example 4 | 0.85 | 70 |
| Comparative Example 5 | 0.86 | 71 |
| Comparative Example 6 | 0.83 | 69 |

(Results)

Figure 11:
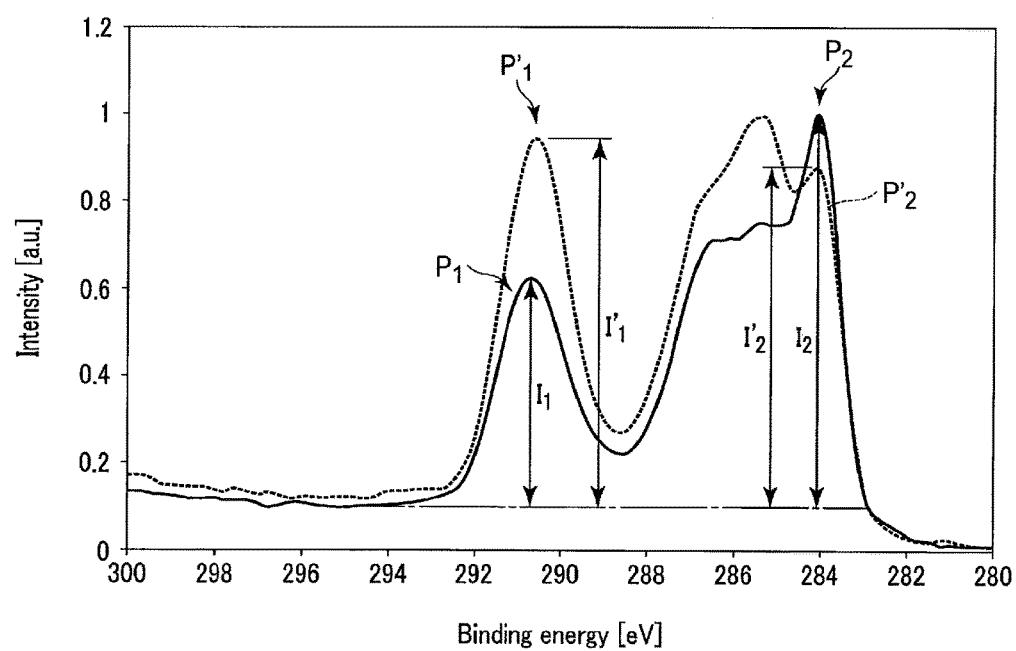
FIG. 11 shows parts of XPS spectra of surfaces of negative electrodes included in nonaqueous electrolyte batteries of Example 1 and Comparative Example 1.

FIG. 11 illustrates a part (solid line) of an XPS spectrum of the surface of the negative electrode included in the nonaqueous electrolyte battery of Example 1, and a part (dotted line) of an XPS spectrum of the surface of the negative electrode included in the battery of Comparative Example 1.

To begin with, as is clear from FIG. 11, the spectrum of the surface of the negative electrode included in the nonaqueous electrolyte battery of Example 1 has a peak $P_1$ with a peak top at binding energy of 291 eV. The intensity $I_1$ of this peak $P_1$ is less than an intensity $I'_1$ of a peak $P'_1$ which appears at the same binding energy in the spectrum of the surface of the negative electrode included in the nonaqueous electrolyte battery of Comparative Example 1. In addition, the spectrum of the surface of the negative electrode included in the nonaqueous electrolyte battery of Example 1 has a peak $P_2$ with a peak top at binding energy of 284 eV. The intensity $I_2$ of this peak $P_2$ is larger than an intensity $I'_2$ of a peak $P'_2$ which appears at the same binding energy in the spectrum of the surface of the negative electrode included in the nonaqueous electrolyte battery of Comparative Example 1. In addition, while the intensity ratio $I'_2/I'_1$ of Comparative Example 1 was 0.95, the intensity ratio $I_2/I_1$ of Example 1 was 1.67.

As shown in Table 3 and Table 4, each of the nonaqueous electrolyte batteries of Examples 1 to 47, in which the intensity ratio $I_2/I_1$ is 1 or more, exhibited a higher capacity retention ratio after cycles than that of each of the nonaqueous electrolyte batteries of Comparative Examples 1 to 8, in which the intensity ratio $I'_2/I'_1$ is less than 1. In other words, each of the nonaqueous electrolyte batteries of Examples 1 to 47, in which the intensity ratio $I_2/I_1$ is 1 or more, could exhibit more excellent life characteristics than each of the nonaqueous electrolyte batteries of Comparative Examples 1 to 8.

In Comparative Example 1, the same first aging and second aging as in Example 1 were conducted, but a sufficient film was not formed on the negative electrode active material-containing layer. It is considered that this was due to the composition of the electrolyte.

In Comparative Example 2, the first aging and second aging, which were conducted in Example 1, were conducted in the reverse order. From the result of Comparative Example 2, the following is found. The battery unit, which was adjusted to a high SOC, was subjected to aging at high temperatures. Subsequently, the battery unit, which was adjusted to a lower SOC than in the preceding aging, was subjected to aging at lower temperatures than in the preceding aging. As a result, the intensity ratio $I_2/I_1$ was less than 1, and a sufficient film was not formed on the negative electrode active material-containing layer.

Comparative Examples 3 to 6 are examples in which the aging was conducted only once. From the results of Comparative Examples 3 to 6, it is found that even if the conditions were changed, when the aging was conducted only once, the intensity ratio $I_2/I_1$ was less than 1, and a sufficient film was not formed on the negative electrode active material-containing layer.

For example, a battery, which are newly fabricated by using the negative electrode included in the nonaqueous electrolyte battery of each of Examples, can also exhibit excellent life characteristics.

Example 48

In Example 48, a nonaqueous electrolyte battery of Example 48 was fabricated according to the same procedure as in Example 1, except that an orthorhombic Na-containing niobium-titanium composite oxide having a composition represented by a formula of $Li_2Na_{0.2}Ti_{4.2}Nb_{1.8}O_{14}$ was used as the negative electrode active material.

The orthorhombic Na-containing niobium-titanium composite oxide having the composition represented by the formula of $Li_2Na_{0.2}Ti_{4.2}Nb_{1.8}O_{14}$ was synthesized according to the following procedure.

To begin with, as raw materials, titanium oxide $TiO_2$, lithium carbonate $Li_2CO_3$, sodium carbonate $Na_2CO_3$, and niobium (V) hydroxide $Nb(OH)_5$ were provided. These raw materials were mixed such that the mole ratio of Li:Na:Ti:Nb of the mixture becomes 2.0:0.2:4.2:1.8. Prior to the mixing, the raw materials were fully ground.

The mixed raw material was subjected to heat treatment for 10 hours at 1000° C. in an air atmosphere. Thus, a powder of a product was obtained. The obtained product powder were subjected to a wet-type ball milling process in pure water for 5 hours, and then filtered. Thereafter, reheat treatment was conducted. The conditions for the reheat treatment were 600° C. and 3 hours. Thus, a powder of negative electrode active material was obtained.

The obtained negative electrode active material was analyzed by the above-described ICP, SEM-EDX, and XRD. As a result, it was found that the obtained negative electrode active material is the powder of the orthorhombic Na-containing niobium-titanium composite oxide having the composition represented by the formula of $Li_2Na_{0.2}Ti_{4.2}Nb_{1.8}O_{14}$.

By using the active material obtained as described above, a negative electrode intermediate member was fabricated according to the following procedure.

The active material prepared as described above, acetylene black, and polyvinylidene fluoride (PVdF) were dispersed in N-methylpyrrolidone (NMP) at a mixture ratio of 90% by mass:5% by mass:5% by mass, and were mixed to obtain a mixture. This mixture was further stirred by using a planetary centrifugal mixer to prepare a slurry. This slurry was coated on both surfaces of a current collector formed of an aluminum foil having a thickness of 15 μm, and the coated film was dried. Next, the dried coated film was pressed to fabricate a negative electrode intermediate member, which includes the current collector, and the negative electrode active material-containing layer which is formed on the current collector and has an electrode density (excluding the current collector) of 2.3 g/cm$^3$.

Note that, when the slurry was coated, a part of the current collector was left as a slurry non-coated part. This part was configured as a negative electrode tab. A negative electrode terminal was ultrasonic-bonded to the negative electrode tab.

Example 49

In Example 49, a nonaqueous electrolyte battery of Example 49 was fabricated according to the same procedure as in Example 1, except that an orthorhombic Na-containing niobium-titanium composite oxide having a composition represented by a formula of $Li_2Na_{1.3}Mg_{0.1}Ti_{5.5}Nb_{0.5}O_{14}$ was used as the negative electrode active material.

The orthorhombic Na-containing niobium-titanium composite oxide having the composition represented by the formula of $Li_2Na_{1.3}Mg_{0.1}Ti_{5.5}Nb_{0.5}O_{14}$ was synthesized according to the following procedure.

To begin with, as raw materials, titanium oxide $TiO_2$, lithium carbonate $Li_2CO_3$, sodium carbonate $Na_2CO_3$, niobium (V) hydroxide $Nb(OH)_5$ and magnesium oxide MgO were provided. These raw materials were mixed such that the mole ratio of Li:Na:Ti:Nb:Mg of the mixture becomes 2.0:1.3:5.5:0.5:0.1. Prior to the mixing, the raw materials were fully ground.

The mixed raw material was subjected to heat treatment for 10 hours at 1000° C. in an air atmosphere. Thus, a powder of a product was obtained. The obtained product powder was subjected to a wet-type ball milling process in pure water for 5 hours, and then filtered. Thereafter, reheat treatment was conducted. The conditions for the reheat treatment were 600° C. and 3 hours. Thus, a powder of negative electrode active material was obtained.

The obtained negative electrode active material was analyzed by the above-described ICP, SEM-EDX, and XRD. As a result, it was found that the obtained negative electrode active material is the powder of the orthorhombic Na-containing niobium-titanium composite oxide having the composition represented by the formula of $Li_2Na_{1.3}Mg_{0.1}Ti_{5.5}Nb_{0.5}O_{14}$.

By using the active material obtained as described above, a negative electrode intermediate member was fabricated according to the following procedure.

The active material prepared as described above, acetylene black, and polyvinylidene fluoride (PVdF) were dispersed in N-methylpyrrolidone (NMP) at a mixture ratio of 90% by mass:5% by mass:5% by mass, and were mixed to obtain a mixture. This mixture was further stirred by using a planetary centrifugal mixer to prepare a slurry. This slurry was coated on both surfaces of a current collector formed of an aluminum foil having a thickness of 15 μm, and the coated film was dried. Next, the dried coated film was pressed to fabricate a negative electrode intermediate member, which includes the current collector, and the negative electrode active material-containing layer which is formed on the current collector and has an electrode density (excluding the current collector) of 2.3 g/cm$^3$.

Note that, when the slurry was coated, a part of the current collector was left as a slurry non-coated part. This part was configured as a negative electrode tab. A negative electrode terminal was ultrasonic-bonded to the negative electrode tab.

Example 50

In Example 50, a nonaqueous electrolyte battery of Example 50 was fabricated according to the same procedure as in Example 1, except that an orthorhombic Na-containing niobium-titanium composite oxide having a composition represented by a formula of $Li_2Na_{1.3}Ca_{0.1}Ti_{5.5}Nb_{0.5}O_{14}$ was used as the negative electrode active material.

The orthorhombic Na-containing niobium-titanium composite oxide having the composition represented by the formula of $Li_2Na_{1.3}Ca_{0.1}Ti_{5.5}Nb_{0.5}O_{14}$ was synthesized according to the following procedure.

To begin with, as raw materials, titanium oxide $TiO_2$, lithium carbonate $Li_2CO_3$, sodium carbonate $Na_2CO_3$, niobium (V) hydroxide $Nb(OH)_5$ and calcium oxide CaO were provided. These raw materials were mixed such that the mole ratio of Li:Na:Ti:Nb:Ca of the mixture becomes 2.0:1.3:5.5:0.5:0.1. Prior to the mixing, the raw materials were fully ground.

The mixed raw material was subjected to heat treatment for 10 hours at 1000° C. in an air atmosphere. Thus, a powder of a product was obtained. The obtained product powder was subjected to a wet-type ball milling process in pure water for 5 hours, and then filtered. Thereafter, reheat treatment was conducted. The conditions for the reheat treatment were 600° C. and 3 hours. Thus, a powder of negative electrode active material was obtained.

The obtained negative electrode active material was analyzed by the above-described ICP, SEM-EDX, and XRD. As a result, it was found that the obtained negative electrode active material is the powder of the orthorhombic Na-containing niobium-titanium composite oxide having the composition represented by the formula of $Li_2Na_{1.3}Ca_{0.1}Ti_{5.5}Nb_{0.5}O_{14}$.

By using the active material obtained as described above, a negative electrode intermediate member was fabricated according to the following procedure.

The active material prepared as described above, acetylene black, and polyvinylidene fluoride (PVdF) were dispersed in N-methylpyrrolidone (NMP) at a mixture ratio of 90% by mass:5% by mass:5% by mass, and were mixed to obtain a mixture. This mixture was further stirred by using a planetary centrifugal mixer to prepare a slurry. This slurry was coated on both surfaces of a current collector formed of an aluminum foil having a thickness of 15 μm, and the coated film was dried. Next, the dried coated film was pressed to fabricate a negative electrode intermediate member, which includes the current collector, and the negative electrode active material-containing layer which is formed on the current collector and has an electrode density (excluding the current collector) of 2.3 g/cm$^3$.

Note that, when the slurry was coated, a part of the current collector was left as a slurry non-coated part. This part was configured as a negative electrode tab. A negative electrode terminal was ultrasonic-bonded to the negative electrode tab.

Example 51

In Example 51, a nonaqueous electrolyte battery of Example 51 was fabricated according to the same procedure as in Example 1, except that an orthorhombic Na-containing niobium-titanium composite oxide having a composition represented by a formula of $Li_2Na_{1.3}Sr_{0.1}Ti_{5.5}Nb_{0.5}O_{14}$ was used as the negative electrode active material.

The orthorhombic Na-containing niobium-titanium composite oxide having the composition represented by the formula of $Li_2Na_{1.3}Sr_{0.1}Ti_{5.5}Nb_{0.5}O_{14}$ was synthesized according to the following procedure.

To begin with, as raw materials, titanium oxide $TiO_2$, lithium carbonate $Li_2CO_3$, sodium carbonate $Na_2CO_3$, niobium (V) hydroxide $Nb(OH)_5$ and strontium oxide SrO were provided. These raw materials were mixed such that the mole ratio of Li:Na:Ti:Nb:Sr of the mixture becomes 2.0:1.3:5.5:0.5:0.1. Prior to the mixing, the raw materials were fully ground.

The mixed raw material was subjected to heat treatment for 10 hours at 1000° C. in an air atmosphere. Thus, a powder of a product was obtained. The obtained product powder was subjected to a wet-type ball milling process in pure water for 5 hours, and then filtered. Thereafter, reheat treatment was conducted. The conditions for the reheat treatment were 600° C. and 3 hours. Thus, a powder of negative electrode active material was obtained.

The obtained negative electrode active material was analyzed by the above-described ICP, SEM-EDX, and XRD. As a result, it was found that the obtained negative electrode active material is the powder of the orthorhombic Na-containing niobium-titanium composite oxide having the composition represented by the formula of $Li_2Na_{1.3}Sr_{0.1}Ti_{5.5}Nb_{0.5}O_{14}$.

By using the active material obtained as described above, a negative electrode intermediate member was fabricated according to the following procedure.

The active material prepared as described above, acetylene black, and polyvinylidene fluoride (PVdF) were dispersed in N-methylpyrrolidone (NMP) at a mixture ratio of 90% by mass:5% by mass:5% by mass, and were mixed to obtain a mixture. This mixture was further stirred by using a planetary centrifugal mixer to prepare a slurry. This slurry was coated on both surfaces of a current collector formed of an aluminum foil having a thickness of 15 μm, and the coated film was dried. Next, the dried coated film was pressed to fabricate a negative electrode intermediate member, which includes the current collector, and the negative electrode active material-containing layer which is formed on the current collector and has an electrode density (excluding the current collector) of 2.3 g/cm$^3$.

Note that, when the slurry was coated, a part of the current collector was left as a slurry non-coated part. This part was configured as a negative electrode tab. A negative electrode terminal was ultrasonic-bonded to the negative electrode tab.

Example 52

In Example 52, a nonaqueous electrolyte battery of Example 52 was fabricated according to the same procedure as in Example 1, except that an orthorhombic Na-containing niobium-titanium composite oxide having a composition represented by a formula of $Li_2Na_{1.7}Ti_{5.5}Nb_{0.4}Al_{0.1}O_{14}$ was used as the negative electrode active material.

The orthorhombic Na-containing niobium-titanium composite oxide having the composition represented by the formula of $Li_2Na_{1.7}Ti_{5.5}Nb_{0.4}Al_{0.1}O_{14}$ was synthesized according to the following procedure.

To begin with, as raw materials, titanium oxide $TiO_2$, lithium carbonate $Li_2CO_3$, sodium carbonate $Na_2CO_3$, niobium (V) hydroxide $Nb(OH)_5$, and aluminum hydroxide $Al(OH)_3$ were provided. These raw materials were mixed such that the mole ratio of Li:Na:Ti:Nb:Al of the mixture becomes 2.0:1.7:5.5:0.4:0.1. Prior to the mixing, the raw materials were fully ground.

The mixed raw material was subjected to heat treatment for 10 hours at 1000° C. in an air atmosphere. Thus, a powder of a product was obtained. The obtained product powder was subjected to a wet-type ball milling process in pure water for 5 hours, and then filtered. Thereafter, reheat treatment was conducted. The conditions for the reheat treatment were 600° C. and 3 hours. Thus, a powder of negative electrode active material was obtained.

The obtained negative electrode active material was analyzed by the above-described ICP, SEM-EDX, and XRD. As a result, it was found that the obtained negative electrode active material is the powder of the orthorhombic Na-containing niobium-titanium composite oxide having the composition represented by the formula of $Li_2Na_{1.7}Ti_{5.5}Nb_{0.4}Al_{0.1}O_{14}$.

By using the active material obtained as described above, a negative electrode intermediate member was fabricated according to the following procedure.

The active material prepared as described above, acetylene black, and polyvinylidene fluoride (PVdF) were dispersed in N-methylpyrrolidone (NMP) at a mixture ratio of 90% by mass:5% by mass:5% by mass, and were mixed to obtain a mixture. This mixture was further stirred by using a planetary centrifugal mixer to prepare a slurry. This slurry was coated on both surfaces of a current collector formed of an aluminum foil having a thickness of 15 μm, and the coated film was dried. Next, the dried coated film was pressed to fabricate a negative electrode intermediate member, which includes the current collector, and the negative electrode active material-containing layer which is formed on the current collector and has an electrode density (excluding the current collector) of 2.3 g/cm$^3$.

Note that, when the slurry was coated, a part of the current collector was left as a slurry non-coated part. This part was configured as a negative electrode tab. A negative electrode terminal was ultrasonic-bonded to the negative electrode tab.

Example 53

In Example 53, a nonaqueous electrolyte battery of Example 53 was fabricated according to the same procedure as in Example 1, except that an orthorhombic Na-containing niobium-titanium composite oxide having a composition represented by a formula of $Li_2Na_{1.4}Ti_{5.5}Nb_{0.4}Mo_{0.1}O_{14}$ was used as the negative electrode active material.

The orthorhombic Na-containing niobium-titanium composite oxide having the composition represented by the formula of $Li_2Na_{1.4}Ti_{5.5}Nb_{0.4}Mo_{0.1}O_{14}$ was synthesized according to the following procedure.

To begin with, as raw materials, titanium oxide $TiO_2$, lithium carbonate $Li_2CO_3$, sodium carbonate $Na_2CO_3$, niobium (V) hydroxide $Nb(OH)_5$, and molybdenum oxide $MoO_2$ were provided. These raw materials were mixed such that the mole ratio of Li:Na:Ti:Nb:Mo of the mixture becomes 2.0:1.4:5.5:0.4:0.1. Prior to the mixing, the raw materials were fully ground.

The mixed raw material was subjected to heat treatment for 10 hours at 1000° C. in an air atmosphere. Thus, a powder of a product was obtained. The obtained product powder was subjected to a wet-type ball milling process in pure water for 5 hours, and then filtered. Thereafter, reheat treatment was conducted. The conditions for the reheat treatment were 600° C. and 3 hours. Thus, a powder of negative electrode active material was obtained.

The obtained negative electrode active material was analyzed by the above-described ICP, SEM-EDX, and XRD. As a result, it was found that the obtained negative electrode active material is the powder of the orthorhombic Na-containing niobium-titanium composite oxide having the composition represented by the formula of $Li_2Na_{1.4}Ti_{5.5}Nb_{0.4}Mo_{0.1}O_{14}$.

By using the active material obtained as described above, a negative electrode intermediate member was fabricated according to the following procedure.

The active material prepared as described above, acetylene black, and polyvinylidene fluoride (PVdF) were dispersed in N-methylpyrrolidone (NMP) at a mixture ratio of 90% by mass:5% by mass:5% by mass, and were mixed to obtain a mixture. This mixture was further stirred by using a planetary centrifugal mixer to prepare a slurry. This slurry was coated on both surfaces of a current collector formed of an aluminum foil having a thickness of 15 μm, and the coated film was dried. Next, the dried coated film was pressed to fabricate a negative electrode intermediate member, which includes the current collector, and the negative electrode active material-containing layer which is formed on the current collector and has an electrode density (excluding the current collector) of 2.3 g/cm$^3$.

Note that, when the slurry was coated, a part of the current collector was left as a slurry non-coated part. This part was configured as a negative electrode tab. A negative electrode terminal was ultrasonic-bonded to the negative electrode tab.

Example 54

In Example 54, a nonaqueous electrolyte battery of Example 54 was fabricated according to the same procedure as in Example 1, except that a negative electrode active material used was changed.

In Example 54, as a negative electrode active material, there was used a mixed powder of a powder of the same orthorhombic Na-containing niobium-titanium composite oxide as that of Example 1 and a powder of a niobium-titanium composite oxide having a composition represented by a formula of $Nb_2TiO_7$. A weight ratio of the orthorhombic Na-containing niobium-titanium composite oxide powder: the niobium-titanium composite oxide powder was set to 70:30.

The niobium-titanium composite oxide having the composition represented by the formula of $Nb_2TiO_7$ was synthesized according to the following procedure.

To begin with, as raw materials, titanium oxide $TiO_2$ and niobium oxide $Nb_2O_5$ were provided. These raw materials were mixed such that the mole ratio of Nb:Ti of the mixture becomes 2.0:1.0. Prior to the mixing, the raw materials were fully ground.

The mixed raw material was subjected to heat treatment for 30 hours at 1350° C. in an air atmosphere. Thus, a powder of a product was obtained.

The obtained product powder was analyzed by the above-described ICP, SEM-EDX, and XRD. As a result, it was found that the obtained product powder is the powder of the niobium-titanium composite oxide having the composition represented by the formula of $Nb_2TiO_7$.

By using the mixed powder provided as described above, a negative electrode intermediate member was fabricated according to the following procedure.

The mixed powder, acetylene black, and polyvinylidene fluoride (PVdF) were dispersed in N-methylpyrrolidone (NMP) at a mixture ratio of 90% by mass:5% by mass:5% by mass, and were mixed to obtain a mixture. This mixture was further stirred by using a planetary centrifugal mixer to prepare a slurry. This slurry was coated on both surfaces of a current collector formed of an aluminum foil having a thickness of 15 μm, and the coated film was dried. Next, the dried coated film was pressed to fabricate a negative electrode intermediate member, which includes the current collector and the negative electrode active material-containing layer, which is formed on the current collector and has an electrode density (excluding the current collector) of 2.3 g/cm³.

Note that, when the slurry was coated, a part of the current collector was left as a slurry non-coated part. This part was configured as a negative electrode tab. A negative electrode terminal was ultrasonic-bonded to the negative electrode tab.

Example 55

In Example 55, a nonaqueous electrolyte battery of Example 55 was fabricated according to the same procedure as in Example 1, except that a negative electrode active material used was changed.

In Example 55, as a negative electrode active material, there was used a mixed powder of a powder of the same orthorhombic Na-containing niobium-titanium composite oxide as that of Example 1 and a powder of a lithium titanate having a composition represented by a formula of $Li_4Ti_5O_{12}$. A weight ratio of the orthorhombic Na-containing niobium-titanium composite oxide powder:the lithium titanate powder was set to 70:30.

The lithium titanate having the composition represented by the formula of $Li_4Ti_5O_{12}$ was synthesized according to the following procedure.

To begin with, as raw materials, titanium oxide $TiO_2$ and lithium carbonate $Li_2CO_3$ were provided. These raw materials were mixed such that the mole ratio of Li:Ti of the mixture becomes 4.0:5.0. Prior to the mixing, the raw materials were fully ground.

The mixed raw material was subjected to heat treatment for 12 hours at 800° C. in an air atmosphere. Thus, a powder of a product was obtained.

The obtained product powder was analyzed by the above-described ICP, SEM-EDX, and XRD. As a result, it was found that the obtained negative electrode active material is the powder of the lithium titanate having the composition represented by the formula of $Li_4Ti_5O_{12}$.

By using the mixed powder provided described above, a negative electrode intermediate member was fabricated according to the following procedure.

The mixed powder, acetylene black, and polyvinylidene fluoride (PVdF) were dispersed in N-methylpyrrolidone (NMP) at a mixture ratio of 90% by mass:5% by mass:5% by mass, and were mixed to obtain a mixture. This mixture was further stirred by using a planetary centrifugal mixer to prepare a slurry. This slurry was coated on both surfaces of a current collector formed of an aluminum foil having a thickness of 15 μm, and the coated film was dried. Next, the dried coated film was pressed to fabricate a negative electrode intermediate member, which includes the current collector and the negative electrode active material-containing layer, which is formed on the current collector and has an electrode density (excluding the current collector) of 2.3 g/cm³.

Note that, when the slurry was coated, a part of the current collector was left as a slurry non-coated part. This part was configured as a negative electrode tab. A negative electrode terminal was ultrasonic-bonded to the negative electrode tab.

The composition of the negative electrode active material and the condition of the aging of each of the nonaqueous electrolyte batteries of Examples 48 to 55 were shown in the Table 5 below. Should be noted that the aging conditions in each of Examples 48 to 55 were set to the same as those of Example 1. Furthermore, the respective nonaqueous electrolyte batteries of Examples 48 to 55 were subjected to tests, like the nonaqueous electrolyte battery of Example 1. The results of the tests are shown in Table 6 below.

TABLE 5

| | Composition of Active Material | First Aging Process | | | Second Aging Process | | |
|---|---|---|---|---|---|---|---|
| | | Temperature/° C. | Duration/h | Voltage/V | Temperature/° C. | Duration/h | Voltage/V |
| Example 48 | $Li_2Na_{0.2}Ti_{4.2}Nb_{1.8}O_{14}$ | 60 | 10 | 2.5 | 80 | 10 | 2.8 |
| Example 49 | $Li_2Na_{1.3}Mg_{0.1}Ti_{5.5}Nb_{0.5}O_{14}$ | 60 | 10 | 2.5 | 80 | 10 | 2.8 |
| Example 50 | $Li_2Na_{1.3}Ca_{0.1}Ti_{5.5}Nb_{0.5}O_{14}$ | 60 | 10 | 2.5 | 80 | 10 | 2.8 |
| Example 51 | $Li_2Na_{1.3}Sr_{0.1}Ti_{5.5}Nb_{0.5}O_{14}$ | 60 | 10 | 2.5 | 80 | 10 | 2.8 |

TABLE 5-continued

|  | Composition of Active Material | First Aging Process | | | Second Aging Process | | |
| --- | --- | --- | --- | --- | --- | --- | --- |
|  |  | Temper- ature/° C. | Dura- tion/h | Volt- age/V | Temper- ature/° C. | Dura- tion/h | Volt- age/V |
| Example 52 | $Li_2Na_{1.7}Ti_{5.5}Nb_{0.4}Al_{0.1}O_{14}$ | 60 | 10 | 2.5 | 80 | 10 | 2.8 |
| Example 53 | $Li_2Na_{1.4}Ti_{5.5}Nb_{0.4}Mo_{0.1}O_{14}$ | 60 | 10 | 2.5 | 80 | 10 | 2.8 |
| Example 54 | $Li_2Na_{1.5}Ti_{5.5}Nb_{0.5}O_{14}$ and $Nb_2TiO_7$ | 60 | 10 | 2.5 | 80 | 10 | 2.8 |
| Example 55 | $Li_2Na_{1.5}Ti_{5.5}Nb_{0.5}O_{14}$ and $Li_4Ti_5O_{12}$ | 60 | 10 | 2.5 | 80 | 10 | 2.8 |

TABLE 6

|  | Intensity Ratio $I_2/I_1$ | Capacity Retention Ratio after Cycles (%) |
| --- | --- | --- |
| Example 48 | 1.23 | 89 |
| Example 49 | 1.18 | 88 |
| Example 50 | 1.17 | 88 |
| Example 51 | 1.15 | 86 |
| Example 52 | 1.19 | 89 |
| Example 53 | 1.29 | 90 |
| Example 54 | 1.35 | 92 |
| Example 55 | 1.42 | 95 |

From the results shown in Tables 3 to 5, it is found that, as with the batteries of Examples 1 to 47, each of the nonaqueous electrolyte batteries of Examples 48 to 55, in which the intensity ratio $I_2/I_1$ is 1 or more, exhibited a higher capacity retention ratio after cycles than that of each of the nonaqueous electrolyte batteries of Comparative Examples 1 to 8, in which the intensity ratio $I'_2/I'_1$ is less than 1. In other words, each of the nonaqueous electrolyte batteries of Examples 48 to 55, in which the intensity ratio $I_2/I_1$ is 1 or more, could exhibit more excellent life characteristics than each of the nonaqueous electrolyte batteries of Comparative Examples 1 to 8.

Furthermore, Table 1 to 3, 5 and 6 shows that each of the nonaqueous electrolyte batteries of Examples 1 to 53 could exhibit excellent life characteristics even if the composition of the orthorhombic Na-containing niobium-titanium composite oxide was changed. Also, Table 1 to 3, 5 and 6 shows that as with the nonaqueous electrolyte batteries of Examples 1 to 53, the nonaqueous electrolyte batteries, each of which the negative electrode active material-containing layer includes a negative electrode active material other than the orthorhombic Na-containing niobium-titanium composite oxide, could exhibit excellent life characteristics.

According to at least one of the above-described embodiments and Examples, a nonaqueous electrolyte battery is provided. The nonaqueous electrolyte battery includes a negative electrode, a positive electrode, and a nonaqueous electrolyte. The negative electrode includes a negative electrode active material-containing layer. The negative electrode active material-containing layer includes an Na-containing niobium-titanium composite oxide having an orthorhombic crystal structure. The negative electrode active material-containing layer has a ratio $I_2/I_1$ according to X-ray photoelectron spectroscopy, which satisfies $I_2/I_1 \geq 1$. This nonaqueous electrolyte battery can suppress a side reaction between the nonaqueous electrolyte and the Na-containing niobium-titanium composite oxide included in the negative electrode active material-containing layer. As a result, this nonaqueous electrolyte battery can exhibit excellent life characteristics.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electrode comprising:
   an active material-containing layer comprising an Na-containing niobium-titanium composite oxide having an orthorhombic crystal structure,
   wherein the active material-containing layer satisfies $I_2/I_1 \geq 1$, where $I_1$ is an intensity of a peak $P_1$ appearing in a binding energy range of 289 eV to 292 eV in an X-ray photoelectron spectroscopy spectrum of the active material-containing layer, and $I_2$ is an intensity of a peak $P_2$ appearing in a binding energy range of 283 eV to 285 eV in the X-ray photoelectron spectroscopy spectrum.

2. The electrode according to claim 1, wherein the Na-containing niobium-titanium composite oxide is represented by a general formula of $Li_{2+v}Na_{2-w}M1_xTi_{6-y-z}Nb_yM2_zO_{14+\delta}$,
   in the general formula;
   $0 \leq v \leq 4$, $0 < w < 2$, $0 \leq x < 2$, $0 < y < 2$, $0 \leq z < 3$, and $-0.5 \leq \delta \leq 0.5$;
   the M1 is at least one metal element selected from the group consisting of Cs, K, Mg, Sr, Ba and Ca; and
   the M2 is at least one metal element selected from the group consisting of Zr, Sn, V, Ta, Mo, W, Fe, Co, Mn and Al.

3. The electrode according to claim 1, wherein the active material-containing layer satisfies $1 \leq I_2/I_1 \leq 5$.

4. The electrode according to claim 1, wherein the active material-containing layer satisfies $1 \leq I_2/I_1 \leq 3$.

5. A nonaqueous electrolyte battery comprising:
   a negative electrode comprising the electrode according to claim 1;
   a positive electrode; and
   a nonaqueous electrolyte.

6. The nonaqueous electrolyte battery according to claim 5, wherein the Na-containing niobium-titanium composite oxide is represented by a general formula of $Li_{2+v}Na_{2-w}M1_xTi_{6-y-z}Nb_yM2_zO_{14+\delta}$,
   in the general formula;
   $0 \leq v \leq 4$, $0 < w < 2$, $0 \leq x < 2$, $0 < y < 2$, $0 \leq z < 3$, and $-0.5 \leq \delta \leq 0.5$;
   the M1 is at least one metal element selected from the group consisting of Cs, K, Mg, Sr, Ba and Ca; and
   the M2 is at least one metal element selected from the group consisting of Zr, Sn, V, Ta, Mo, W, Fe, Co, Mn and Al.

7. The nonaqueous electrolyte battery according to claim 5, wherein the active material-containing layer satisfies $1 \leq I_2/I_1 \leq 5$.

8. The nonaqueous electrolyte battery according to claim 5, wherein the active material-containing layer satisfies $1 \leq I_2/I_1 \leq 3$.

9. The nonaqueous electrolyte battery according to claim 5, wherein the nonaqueous electrolyte comprises ethylene carbonate.

10. A battery pack comprising the nonaqueous electrolyte battery according to claim 5.

11. The battery pack according to claim 10 further comprising:
an external power distribution terminal; and
a protective circuit.

12. The battery pack according to claim 10 comprising a plural of nonaqueous electrolyte batteries, the plural of the nonaqueous electrolyte batteries being electrically connected in series, in parallel, or in combination of in series and in parallel.

13. A vehicle comprising the battery pack according to claim 10.

14. The vehicle according to claim 13, which comprises a mechanism configured to convert kinetic energy of the vehicle into regenerative energy.

15. The electrode according to claim 1, wherein the electrode comprises a film comprising C and being formed on the active material-containing layer.

16. The electrode according to claim 1, wherein the Na-containing niobium-titanium composite oxide is represented by a formula of $Li_2Na_{1.5}Ti_{5.5}Nb_{0.5}O_{14}$; a formula of $Li_2Na_{1.75}Ti_{5.75}Nb_{0.25}O_{14}$; a formula of $Li_2Na_{1.8}Ti_{5.8}Nb_{0.2}O_{14}$; a formula of $Li_2Na_{1.4}K_{0.1}Ti_{5.5}Nb_{0.5}O_{14}$; a formula of $Li_2Na_{1.6}Ti_{5.5}Nb_{0.4}Zr_{0.1}O_{14}$; a formula of $Li_2Na_{0.2}Ti_{4.2}Nb_{1.8}O_{14}$; a formula of $Li_2Na_{1.3}Mg_{0.1}Ti_{5.5}Nb_{0.5}O_{14}$; a formula of $Li_2Na_{1.3}Ca_{0.1}Ti_{5.5}Nb_{0.5}O_{14}$; a formula of $Li_2Na_{1.3}Sr_{0.1}Ti_{5.5}Nb_{0.5}O_{14}$; a formula of $Li_2Na_{1.7}Ti_{5.5}Nb_{0.4}Al_{0.1}O_{14}$; or a formula of $Li_2Na_{1.4}Ti_{5.5}Nb_{0.4}Mo_{0.1}O_{14}$.

17. The electrode according to claim 15, wherein the film comprises a C—C moiety and/or a $CH_\alpha$ moiety, where $\alpha$ is 1 to 3.

18. The electrode according to claim 1, wherein the active material-containing layer satisfies $1 \leq I_2/I_1 \leq 1.67$.

19. The electrode according to claim 2, wherein the active material-containing layer satisfies $1 \leq I_2/I_1 \leq 5$.

* * * * *